(12) United States Patent
Aldajani et al.

(10) Patent No.: US 7,415,285 B2
(45) Date of Patent: Aug. 19, 2008

(54) REDUCING POWER CONTROL ERRORS IN WIRELESS COMMUNICATION SYSTEM

(75) Inventors: Mansour A. Aldajani, Dhahran (SA); Ali H. Sayed, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 226 days.

(21) Appl. No.: 10/256,606

(22) Filed: Sep. 27, 2002

(65) Prior Publication Data

US 2003/0109225 A1    Jun. 12, 2003

Related U.S. Application Data

(60) Provisional application No. 60/325,350, filed on Sep. 27, 2001.

(51) Int. Cl.
| | |
|---|---|
| *H04B 7/00* | (2006.01) |
| *H04B 1/04* | (2006.01) |
| *H04Q 7/20* | (2006.01) |
| *H04B 17/00* | (2006.01) |

(52) U.S. Cl. ............... 455/522; 455/69; 455/127.1
(58) Field of Classification Search ........... 455/522, 455/69, 67.11, 226.1, 127.1; 370/331, 318, 370/311, 335, 338, 328
See application file for complete search history.

(56) References Cited

U.S. PATENT DOCUMENTS

| | | | |
|---|---|---|---|
| 5,204,878 A | | 4/1993 | Larsson |
| 5,313,495 A | | 5/1994 | Kim |
| 5,574,984 A | * | 11/1996 | Reed et al. .............. 455/69 |
| 5,727,033 A | * | 3/1998 | Weaver et al. ............ 375/358 |
| 5,924,043 A | * | 7/1999 | Takano ................. 455/522 |
| 6,011,956 A | | 1/2000 | Yamano et al. |
| 6,034,952 A | | 3/2000 | Dohi et al. |
| 6,035,209 A | * | 3/2000 | Tiedemann et al. ......... 455/522 |
| 6,163,707 A | * | 12/2000 | Miller ................. 455/522 |
| 6,208,873 B1 | * | 3/2001 | Black et al. ............ 455/522 |
| 6,243,412 B1 | * | 6/2001 | Fukawa ................ 375/219 |
| 6,295,289 B1 | * | 9/2001 | Ionescu et al. ........... 370/342 |
| 6,389,296 B1 | * | 5/2002 | Shiraki et al. .......... 455/522 |
| 6,463,295 B1 | * | 10/2002 | Yun .................... 455/522 |
| 6,512,750 B1 | * | 1/2003 | Palenius ............... 370/318 |
| 6,529,482 B1 | * | 3/2003 | Lundby ................ 370/252 |
| 6,609,008 B1 | * | 8/2003 | Whang et al. .......... 455/522 |
| 6,609,011 B1 | * | 8/2003 | Saito et al. ............ 455/561 |
| 6,621,808 B1 | * | 9/2003 | Sadri ................. 370/335 |
| 6,707,862 B1 | * | 3/2004 | Larsson ............... 375/326 |
| 6,760,320 B1 | * | 7/2004 | Bune .................. 370/342 |

(Continued)

OTHER PUBLICATIONS

T. Ojanpera and R. Prasad, Wideband CDMA for Third Generation Mobile Communications, Artech House, London, 1998, pp. Table of contents, 47-48, 58-62, 153-156 and 208-218.

(Continued)

*Primary Examiner*—Tilahun B Gesessse
(74) *Attorney, Agent, or Firm*—Gates & Cooper LLP

(57) ABSTRACT

The present invention provides a method for predicting channel power fading in a wireless communications system. This prediction method estimates the channel power fading via oversampling of the received and transmitted powers. The prediction method is then combined with several proposed structures for closed loop power control. The resulting structures result in improved performance in wireless communications systems.

16 Claims, 15 Drawing Sheets

U.S. PATENT DOCUMENTS

| | | | | |
|---|---|---|---|---|
| 6,760,598 | B1* | 7/2004 | Kurjenniemi | 455/522 |
| 7,006,842 | B2* | 2/2006 | Bi et al. | 455/522 |
| 7,079,867 | B2* | 7/2006 | Chun et al. | 370/335 |
| 7,113,745 | B2* | 9/2006 | Khayrallah | 370/335 |
| 2002/0131386 | A1* | 9/2002 | Gwon | 370/338 |
| 2003/0109225 | A1* | 6/2003 | Aldajani et al. | 455/69 |
| 2003/0166407 | A1* | 9/2003 | Qian et al. | 455/522 |

OTHER PUBLICATIONS

W. Xinyu, G. Ling, and J. Guoping, "Adaptive power control on the reverse link for CDMA cellular system," Proc. of APCC/OECC'99—5th Asia Pacific Conference on Communications/4th Optoelectronics and Communications Conference, Beijing China, Oct. 1999, vol. 1, pp. 608-611.

S. Nourizadeh, P. Taaghol and R. Tafazolli, "A Novel Closed Loop Power Control for UMTS," First International Conference on 3G Mobile Communication Technologies, London, UK, Mar. 2000, pp. 56-59.

S. Park and H. Nam, "DS/CDMA closed-loop power control with adaptive algorithm," Electronics Letters, IEE, Aug. 19, 1999, vol. 35, No. 17, pp. 1425-1427.

M. Sim, E. Gunawan, B. Soong and C. Soh, "Performance study of close-loop power control algorithms for a cellular CDMA system," IEEE Transactions on Vehicular Technology, IEEE, May 1999, vol. 48, No. 3, pp. 911-921.

H. Su and E. Geraniotis, "Adaptive closed-loop power control with quantized feedback and loop filtering," 1998, IEEE, vol. 2, pp. 926-931.

S. Choe, T. Chulajat, H. Kwon, K. Byung-Jin and S. Hong, "Linear prediction at base station for closed loop power control," IEEE 49th Vehicular Technology Conference, Houston, TX, USA, May 1999, vol. 2, pp. 1469-1473.

J. Tanskanen, A. Huang and I. Hartime, "Predictive power estimators in CDMA closed loop power control," 48th IEEE Vehicular Technology Conference, Ottawa, Ont., Canada, May 18-21, 1998, IEEE, vol. 2, pp. 1091-1095.

A. Abrardo and D. Sennati, "On the analytical evaluation of closed-loop power-control error statistics in DS-CDMA cellular systems," IEEE Trans. Vehic. Tech., vol. 49, No. 6, pp. 2071-2080, Nov. 2000.

F. Lau and W. Tam, "Intelligent closed-loop power control algorithm in CDMA mobile radio system," Electronics Letters, vol. 35, No. 10, pp. 785-786, May 1999.

M. Aldajani and A.H. Sayed, "An adaptive structure for sigma delta modulation with improved dynamic range," Proc. 43rd Midwest Symposium on Circuits and Systems, Lansing, MI, vol. 1, pp. 390-394, Aug. 2000.

M. Aldajani and A.H. Sayed, "A stable adaptive structure for delta modulation with improved performance," Proc. International Conference on Acoustics, Speech and Signal Processing Proceedings, vol. IV of VI, Salt Lake City, Utah, pp. 2621-2624, May 2001.

M. Aldajani and A.H. Sayed, "Stability and performance analysis of an adaptive sigma delta modulator," IEEE Trans. Circuits and Systems II, vol. 48, No. 3, pp. 233-244, Mar. 2001.

C.C. Lee and R. Steele, "Closed-loop power control in CDMA systems" IEE Proceedings-Communications, vol. 143, No. 4, pp. 231-239, Aug. 1996.

V. Garg and J. Wilkes, Principles and Applications of GSM, Prentice Hall, NJ, 1999, Front cover, Copyright page, Table of Contents and pp. 93-96.

* cited by examiner

REDUCING POWER CONTROL ERRORS IN WIRELESS COMMUNICATION SYSTEM

CROSS-REFERENCE TO RELATED APPLICATION

This application claims the benefit under 35 U.S.C. §119(e) of the following and commonly-assigned U.S. Provisional Patent Application Ser. No. 60/325,350, entitled "CLOSED LOOP POWER CONTROL TECHNIQUES IN WIRELESS SYSTEMS," filed on Sep. 27, 2001, by Mansour A. Aldajani and Ali H. Sayed, which application is incorporated by reference herein.

STATEMENT REGARDING FEDERALLY SPONSORED RESEARCH AND DEVELOPMENT

This invention was made with Government support under Grant Nos. 9732376, and 9820765. awarded by the National Science Foundation. The Government has certain rights in this invention.

BACKGROUND OF THE INVENTION

1. Field of the Invention

This invention relates to wireless communications systems, and more particularly, to closed loop power control techniques for use in wireless communications systems.

2. Description of the Related Art (Note: This application references a number of different publications as indicated throughout the specification by reference numbers enclosed in brackets, e.g., [x]. A list of these different publications ordered according to these reference numbers can be found below in Section X of the specification. Each of these publications is incorporated by reference herein.)

Power control is often necessary in wireless communications systems. For example, a DS-CDMA (direct sequence—code division multiple access) wireless communications systems must implement power control, because all users share the same bandwidth to transmit data and interference among users often occurs. Generally, the signal received by a base station (BS) from a nearby mobile station (MS) will dominate that received from a far MS.

The objective of power control is to control the transmission power of the MS such that the average received power from each MS is constant. Power control reduces inter-user interference by overcoming the near-far effect and results in capacity increase of the overall CDMA system. Power control also combats the Rayleigh fading channel effect on the transmitted signal by compensating for the fast fading of the wireless channel. Finally, power control minimizes the power consumption of the MS.

Power control can be classified into two main categories, namely, open loop and closed loop power control. In Open Loop Power Control (OLPC), the MS measures the quality of the signal received from the BS and adjusts its transmission power accordingly. In Closed Loop Power Control (CLPC), the BS measures the fading effects in the signal received from each MS, and then commands each MS to increase or decrease its power accordingly.

Notwithstanding these accomplishments, there remains a need in the art for improved methods of power control.

SUMMARY OF THE INVENTION

The present invention analyzes a conventional closed loop control (CLPC) and derives an expression for the power control error in terms of the channel fading. The expression suggests methods for reducing the error variance. This is achieved by using a prediction technique for estimating the channel power fading via oversampling of the received and transmitted powers. The prediction module is then combined with several proposed schemes for closed loop power control. The resulting architectures are shown to result in improved performance in extensive simulations.

The contributions of this work can be summarized as follows:

1. The classical closed loop power control used in IS-95 CDMA Wireless systems is analyzed using a distinctive approach.

2. A distinctive method suitable for predicting the channel power fading in wireless systems is developed.

3. Seven new algorithms for closed loop power control are developed and analyzed.

The algorithms developed in this invention can be used in the power control of next generation wireless and cellular systems.

A general embodiment of the present invention provides for power control in a wireless communications system, comprising: (a) receiving a signal from a remote transmitter; (b) using a prediction technique for estimating channel power fading in the received signal by oversampling the received signal; (c) comparing the channel power fading with a reference point; and (d) based on the comparison, transmitting a command to the remote transmitter to alter the signal's power accordingly. The using step comprises predicting the channel power fading based on oversampling of the received signal's power variations. The predicting step comprises using an adaptive predictor for estimating the channel power fading of the received signal one-step ahead. The command comprises an estimate of what the signal's power should be for a next period of time, or a power control error resulting from a difference between a desired power level and the received signal's power, wherein the power control error is a function of a variation in the channel power fading and a quantization noise of a sign function.

A first embodiment of the present invention provides a Predictive Ratio Closed Loop Power Control (PR-CLPC) algorithm, comprising: (a) measuring a received power from a mobile station at a base station; (b) estimating a channel power fading from a previous transmission power; (c) generating a predicted channel power fading; (d) multiplying the received power by a ratio of the predicted channel power fading divided by the estimated channel power fading to generate a result; (e) comparing the result with a desired power level to determine a power command for the mobile station; and (f) transmitting the power command to the mobile station, wherein the mobile station increments or decrements its transmission power by a step change in response to the power command.

A second embodiment of the present invention provides an Adaptive Predictive Ratio—Closed Loop Power Control (APR-CLPC) algorithm, comprising: (a) measuring a received power from a mobile station at a base station; (b) estimating a channel power fading from a previous transmission power; (c) generating a predicted channel power fading; (d) multiplying the received power by a ratio of the predicted channel power fading divided by the estimated channel power fading to generate a result; (e) comparing the result with a desired power level to determine a power command for the mobile station; and (f) transmitting the power command to the mobile station, wherein the mobile station computes a signal from the power command and previously-received power commands, computes a term from the signal, computes a step change from the term and increments or decrements its transmission power by the step change.

A third embodiment of the present invention provides a Direct Inverse—Closed Loop Power Control (DI-CLPC) algorithm, comprising: (a) measuring a received power from a mobile station at a base station; (b) estimating a channel power fading from a previous transmission power; (c) generating a predicted channel power fading; (d) generating an estimated transmission power from a ratio of the desired power level divided by the predicted channel power fading; (e) encoding the estimated transmission power to generate encoded data; and (f) transmitting the encoded data to the mobile station, wherein the mobile station decodes the encoded data to obtain the estimated transmission power and sets its transmission power to the estimated transmission power.

A fourth embodiment of the present invention provides an Adaptive Direct Inverse—Closed Loop Power Control (ADI-CLPC) algorithm, comprising: (a) measuring a received power from a mobile station at a base station; (b) estimating a channel power fading from a previous transmission power; (c) generating a predicted channel power fading; (d) generating an estimated transmission power from a ratio of the desired power level divided by the predicted channel power fading; (e) encoding the estimated transmission power to generate coded data; and (f) transmitting the coded data to the mobile station, wherein the mobile station decodes the coded data to obtain the estimated transmission power and sets its transmission power to the estimated transmission power.

A fifth embodiment of the present invention provides an Inverse Estimation—Closed Loop Power Control (IE-CLPC) algorithm, comprising: (a) measuring a receive power from a mobile station at a base station; (b) performing a 1-tap equalization using the measured receive power as an input and a previous transmission power as a reference; (c) multiplying a tap value from the 1-tap equalization by a desired power level to generate an estimated transmission power; (d) encoding the estimated transmission power to generate coded data; and (e) transmitting the coded data to the mobile station, wherein the mobile station decodes the coded data to obtain the estimated transmission power and sets its transmission power to the estimated transmission power.

A sixth embodiment of the present invention provides an Optimal Predictive—Closed Loop Power Control (OP-CLPC) algorithm, comprising: (a) measuring a received power from a mobile station at a base station; (b) estimating a channel power fading from a previous transmission power; (c) generating a predicted channel power fading; (d) multiplying the received power by a ratio of the predicted channel power fading divided by the estimated channel power fading to generate a first result; (e) comparing the first result with a desired power level to determine a difference; (f) multiplying the difference by the estimated channel power fading to generate a second result; (f) multiplying the second result by a step size to generate an estimated transmission power; (g) encoding the estimated transmission power to generate coded data; and (h) transmitting the coded data to the mobile station, wherein the mobile station decodes the coded data to obtain the estimated transmission power and sets its transmission power to the estimated transmission power.

A seventh embodiment of the present invention provides an Error Coding—Closed Loop Power Control (EC-CLPC) algorithm, comprising: (a) measuring a received power from a mobile station at a base station; (b) comparing the received power with a desired power level to generate a difference signal; (g) encoding the difference signal to generate a coded signal; and (h) transmitting the coded signal to the mobile station, wherein the mobile station decodes the coded signal to obtain the difference signal and then increments or decrements its transmission power using the difference signal.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

I. Introduction

The requirement of Power Control (PC) in the uplink DS-CDMA system is a critical limitation [1]. Power control is needed in CDMA systems because all users share the same bandwidth to transmit data and thus inter-user interference will occur. The signal received by the BS from a near MS will dominate that received from a far MS. This phenomenon is referred to as near-far effect.

The objective of power control is to control the transmission power of each MS such that the average received power from each MS is constant. Some advantages of power control can be summarized as follows:

1. Power control reduces inter-user interference by overcoming the near-far effect, which results in capacity increase of the overall CDMA system.

2. Power control combats the Rayleigh fading channel effect on the transmitted signal by compensating for the fast fading of the wireless channel. This reduces the required signal-to-noise ratio, $E_b/N_o$. In perfect power control conditions, power control turns a fading channel into an AWGN (additive white Gaussian noise) channel [1].

3. Power control minimizes the power consumption of the MS's. Instead of using a fixed maximum power by the MS, it will now use an adaptive transmission power based on the power control requirements.

Power control can be classified into two main categories, namely, open loop and closed loop power control. In the following, we give a brief description of each category.

A. Open Loop Power Control

In Open Loop Power Control (OLPC), the MS measures the quality of the signal received from the BS and adjusts its transmission power accordingly. Since the uplink and downlink channel fading effects are not strongly correlated, the performance of OLPC is limited. OLPC is usually useful when dealing with slow shadow fading and only reaches the power requirements on average [1]. Shadow fading is a medium-scale variation in the power of the received signal, which occurs when the MS moves behind obstructions such as trees and foliage.

B. Closed Loop Power Control

Figure 1:
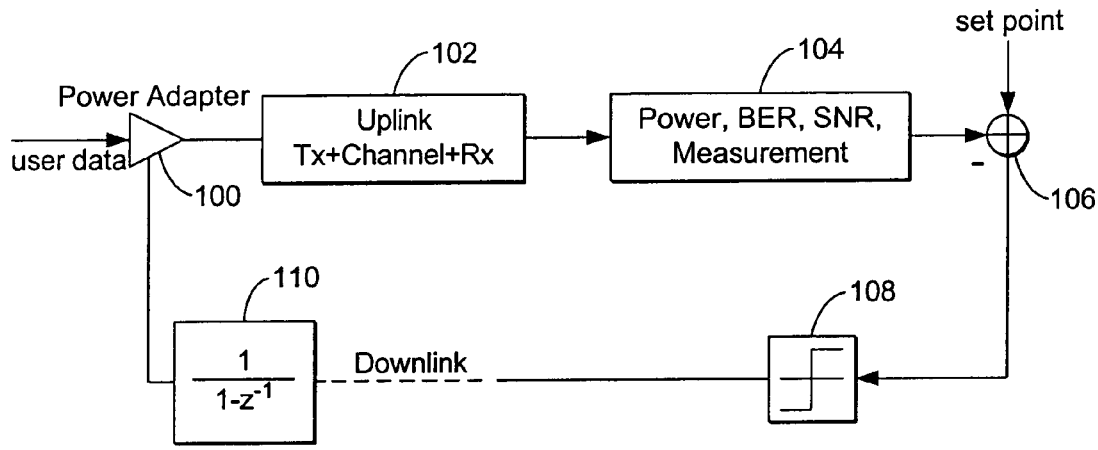
FIG. 1 illustrates the structure of a conventional closed loop power control.

Closed loop power control (CLPC) is a more effective way of dealing with power control requirements. In this case, the BS measures the fading effects in the signal received from each MS. The received power is measured usually by averaging multipe samples of the received sequence, i.e., $$P_r(n) = \frac{1}{T_p} \int_{(n-1)T_p}^{nT_p} y^2(t) dt \qquad (1)$$

where $T_p$ is the power bit period and y(t) is the received signal at the BS. The BS then compares the received power with a reference point. Based on this comparison, the BS transmits a one-bit signal, known as the power bit, to each MS commanding it to increase or decrease its power by a fixed amount, e.g., 1 dB, 0.5 dB, or 0.25 dB. The power bit rate is 800 Hz in IS-95 standards and 1500 Hz in 3G WCDMA standards. FIG. 1 shows a block diagram of this conventional CLPC scheme, including power adapter 100, uplink Tx+Channel+Rx block 102, Power, BER (bit error rate) and SNR (signal to noise ratio) measurement block 104, summing junction 106, single bit quantizer 108 and integrator 110. In the downlink channel, power control is not required since all signals to the different MS's are initiated from the same source.

C. Limitations of Conventional Closed Loop Power Control

Figure 2A:
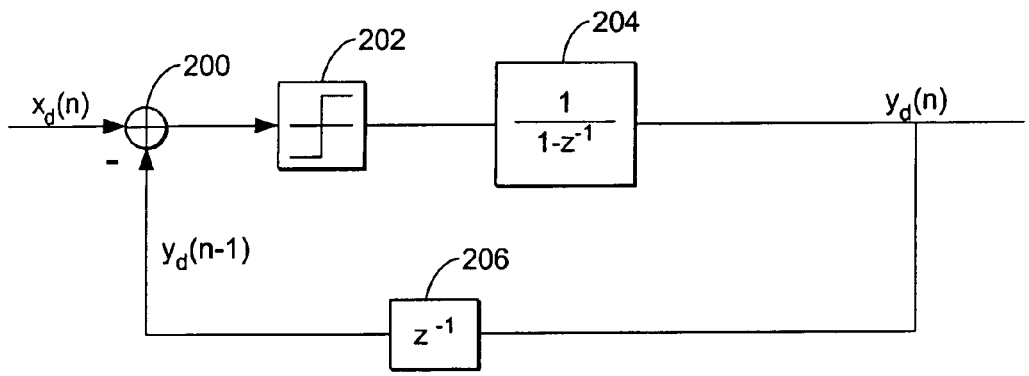
FIG. 2 illustrates the structure of a linear delta modulator.
Figure 2B:
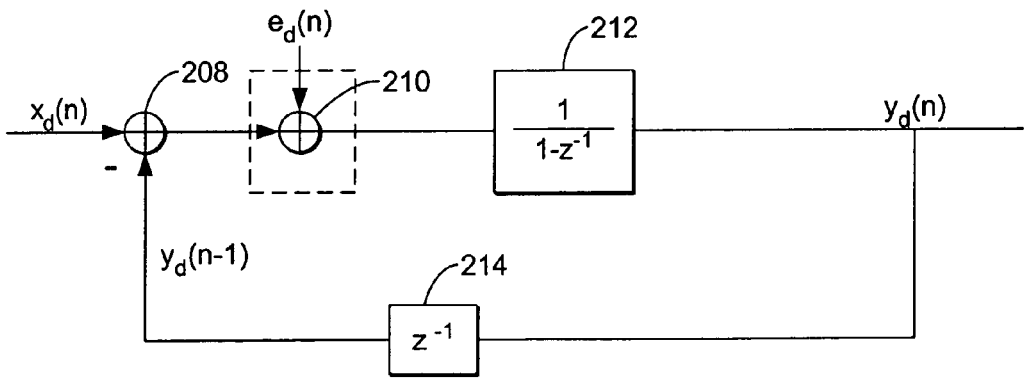

FIGS. 2A and 2B illustrate the basic structure a linear delta modulator. FIG. 2A includes a summing junction 200, single bit quantizer 202, integrator 204, and delay 206. FIG. 2B includes a summing junction 208, summing junction 210, integrator 212, and delay 214.

By comparing FIG. 1 and the linear delta modulator shown in FIGS. 2A and 2B, it can be seen that a conventional CLPC behaves similarly to a delta modulator (DM). Both feedback systems implement two similar operations: sign-of-error and integration. This explains the slow tracking performance exhibited by conventional CLPC in the presence of fast and deep fading of the wireless channel. In addition, CLPC creates a noisy response when the fading is smooth or minimal.

In the literature, there have been two main methods used to improve the performance of the conventional CLPC, namely, adaptive step-size and predictive power control. In adaptive step-size power control, the step-size of the power error quantizer is adapted in a way to cope with the quickly changing and deep channel fading effects. Examples of such schemes can be found in [3], [4], [5], [6]. Predictive power control, on the other hand, is based on predicting the channel attenuation one step ahead [7], [8], [10]. The predicted value is then used in calculating the predicted received power.

In this work, we quantify, mathematically, the performance of the conventional CLPC system. In particular, we shall derive an expression for the power control error (PCE). This expression will unveil the main factors contributing to the limited performance of the conventional CLPC scheme. Later, we shall use these insights to develop new algorithms to overcome these limiting factors and obtain improved power control performance.

II. Analysis of Conventional CLPC

A. Power Channel Model

Let us first describe a model for the wireless channel. In this model, we consider the effect of the uplink channel on the power envelope of the received signal. We assume a multipath channel with Rayleigh fading reflections that are optimally combined using a RAKE receiver with M fingers. The discrete-time received power $P_r(n)$ at the BS can be expressed as [9], [10]:

$$P_r(n) = \frac{1}{T_p} \int_{(n-1)T_p}^{nT_p} P_t(t)Q(t) dt \qquad (2)$$

where $T_p$ is the power control period $P_t(t)$, is the transmission power, and Q(t) is the power gain of the channel. This gain contains all effects of the multipath reflections on the signal power. In [9], the gain Q(t) is given by $$Q(t) = \sum_{p=0}^{L-1} a_p^2(t) \qquad (3)$$

where $a_p$ is the tap weight coefficient relative to the p th finger of the RAKE receiver. In (3) it is assumed that the channel AWGN is "cancelled" by the receiver and that any slow shadow fading by the channel is accounted for by the open loop power control. Therefore, the AWGN is removed from the channel modeling.

The transmission power $P_t(t)$ is kept unchanged during a power control period, so that $$P_r(n) = P_t(n-1)\left[\frac{1}{T_p}\int_{(n-1)T_p}^{nT_p} Q(t)dt\right] \quad (4)$$

Let us denote $$\phi(n) \triangleq \frac{1}{T_p}\int_{(n-1)T_p}^{nT_p} Q(t)dt \quad (5)$$

Then the received power is modeled by $$P_r(n) = \phi(n)P_t(n-1) \quad (6)$$

We shall further assume that the power bit is transmitted from the BS to the MS through the down-link channel with zero BER (bit error rate).

B. Equivalent Model for Conventional CLPCP

Figure 3:
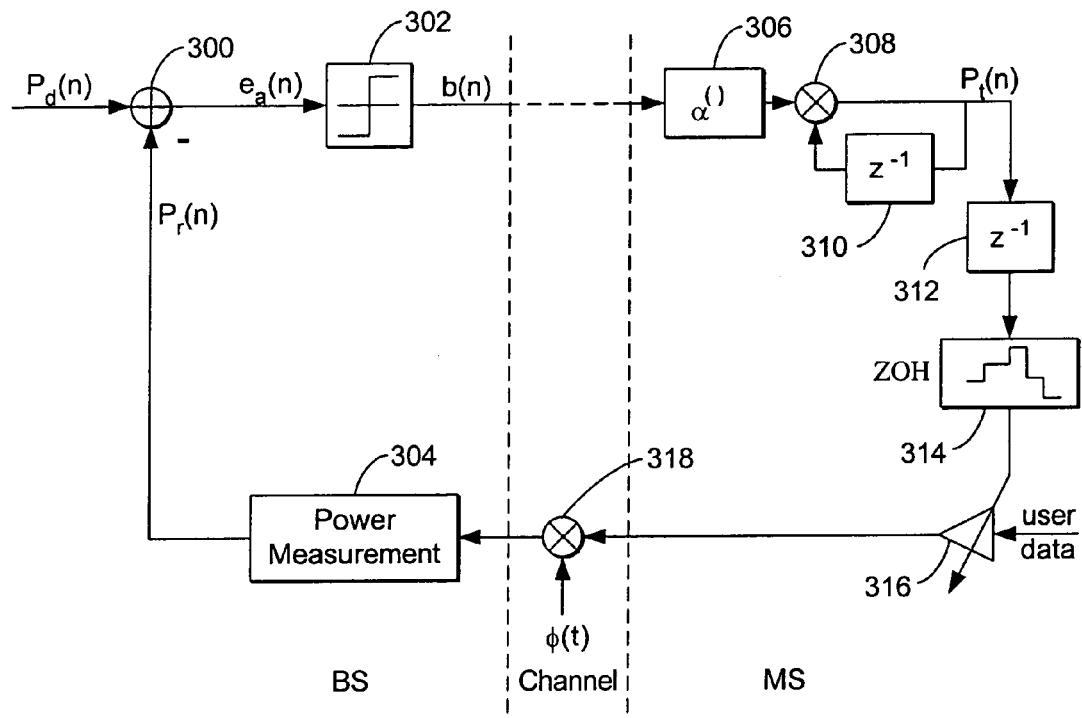
FIG. 3 illustrates the structure of a conventional closed loop power control.

FIG. 3 shows a more detailed block diagram of the conventional CLPC, wherein the BS includes a summing junction 300, single bit quantizer 302, and power measurement block 304, and the MS includes exponential term block 306, multiplier 308, delays 310 and 312, zero-order hold 314, and selectable power adapter 316. The channel between the BS and MS acts as a multiplier 318 between the signal transmitted by the MS and the channel power fading $\phi(t)$.

As shown in FIG. 3, the transmission power $P_t(t)$ used by the MS is attenuated by the channel fading $\phi(t)$. At the BS, the received power $P_r(n)$ is measured and it is then compared to a desired fixed power level $P_d$. The error $e_a(n)$ is given by $$e_a(n) = P_d - P_r(n) \quad (7)$$

Equivalently, using (6), we can write $$e_a(n) = P_d - \phi(n)P_t(n-1) \quad (8)$$

The power error $e_a(n)$ is quantized using a one-bit quantizer to produce the power command bit (PCB) denoted as $b(n)$ scaled by half the step-size of the quantizer $\Delta$, i.e., $$b(n) = \frac{\Delta}{2}\text{sign}[e_a(n)] \quad (9)$$

This PCB is transmitted to the MS. The MS then increments or decrements its transmission power by a fixed amount (in dB). The process is mathematically expressed as $$P_t(n) = \alpha^{b(n)} P_t(n-1) \quad (10)$$

where $\alpha$ is a constant (usually $1 < \alpha < 3$). In other words, $P_t(n)$ is incremented or decremented by $\psi$dB where $$\psi = 10 \log_{10} \alpha \quad (11)$$

Equivalently, for $\psi$dB change in $P_t(n)$, $\alpha$ should be $10^{\psi/10}$.

Let us now take the logarithm of both sides of equation (10):

$$\log_\alpha P_t(n) = b(n) + \log_\alpha P_t(n-1) \quad (12)$$

Using (8) and (9) we can write $$b(n) = \frac{\Delta}{2}\text{sign}[P_d - \phi(n)P_t(n-1)] \quad (13)$$

Now, since the logarithm is an increasing function, we can rewrite this equation as $$b(n) = \frac{\Delta}{2}\text{sign}[\log_\alpha P_d - \log_\alpha(\phi(n)P_t(n-1))] \quad (14)$$

Equivalently, $$b(n) = \frac{\Delta}{2}\text{sign}[\log_\alpha P_d - \log_\alpha \phi(n) - \log_\alpha P_t(n-1)] \quad (15)$$

Therefore, $$b(n) = \frac{\Delta}{2}\text{sign}\left[\log_\alpha \frac{P_d}{\phi(n)} - \log_\alpha P_t(n-1)\right] \quad (16)$$

Substituting this expression into (12), we get $$\log_\alpha P_t(n) = \log_\alpha P_t(n-1) + \frac{\Delta}{2}\text{sign}\left[\log_\alpha \frac{P_d}{\phi(n)} - \log_\alpha P_t(n-1)\right] \quad (17)$$

Figure 4:
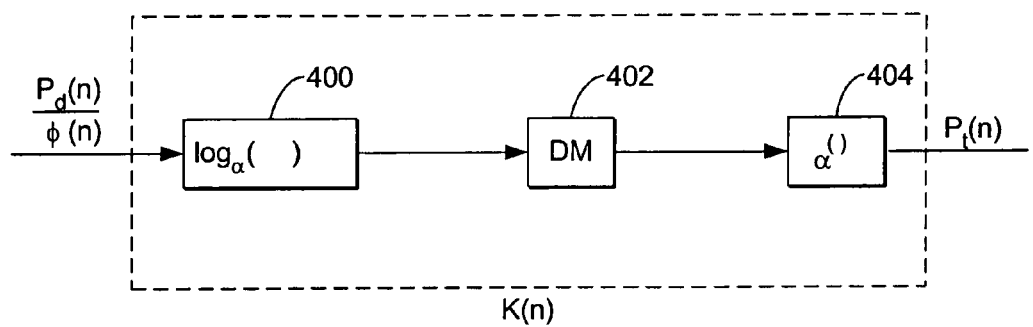
FIG. 4 illustrates an equivalent structure for conventional closed loop power control.

This expression shows that in the logarithmic scale, the relation between $\{P_d, P_t(n)\}$ amounts to a delta modulation scheme with input $$\log_\alpha \frac{P_d}{\phi(n)}$$

and output $\log_\alpha P_t(n)$, as shown in FIG. 4.

FIG. 4 illustrates an equivalent structure for a conventional CLPC, including a logarithm function 400, delta modulator 402, and exponential function 404. This function of this structure is denoted as K(n).

The logarithmic function is added before the delta modulator, while the exponential function is added after the delta modulator to get $P_t(n)$.

In other words, the result (17) shows that the conventional CLPC model of FIG. 3 is actually a companded delta modulator with input $$\frac{P_d}{\phi(n)}$$

and output $P_t(n)$. That is, the CLPC attempts to make the transmission power $P_t(n)$ track the quantity $$\frac{P_d}{\phi(n)}$$

using a companded delta modulator.

C. Power Control Error

Delta modulation is actually the simplest tracking system used in coding and data conversion. It can be shown (e.g., as in [11], [12], [13]) that $P_t(n)$ is related to $\log_\alpha$ $$\log_\alpha \frac{P_d}{\phi(n)}$$

via the model $$P_t(n) = \alpha^{\log_\alpha \frac{P_d}{\phi(n)}} K(n) = \frac{P_d}{\phi(n)} K(n) \quad (18)$$

where K(n) is a random variable that is defined by $$K(n) = \alpha^{e_d(n)} \quad (19)$$

and $e_d(n)$ is a uniform quantization noise in $$\left[-\frac{\Delta}{2}, \frac{\Delta}{2}\right],$$

where $\Delta$ is the step-size of the one-bit quantizer inside the delta modulator. If we substitute (18) into (6), we find that $$P_r(n) = \frac{\phi(n)}{\phi(n-1)} P_d(n-1) K(n-1) \tag{20}$$

For the sake of compactness, let us introduce the notation $$\overline{(.)} \triangleq 10 \log_{10}(.) \tag{21}$$

Therefore, $$\overline{P_r}(n) = \overline{\phi}(n) - \overline{\phi}(n-1) + \overline{P_d} + \overline{K}(n-1) \tag{22}$$

Since $K(n) = \alpha^{e_d(n)}$ and $\overline{\alpha} = 10 \log_{10} \alpha = \psi$, then $$\overline{K}(n) = \psi e_d(n) \tag{23}$$

By substituting (23) into (22), we arrive at the following expression for the received power:

$$\overline{P_r}(n) = \overline{\phi}(n) - \overline{\phi}(n-1) + \overline{P_d} + \psi e_d(n-1) \tag{24}$$

Let us define the power error in dB as $$e(n) \triangleq \overline{P_r}(n) - \overline{P_d} = 10 \log_{10} \frac{P_r(n)}{P_d} \tag{25}$$

where this error is just another way of measuring the difference between $P_r(n)$ and $P_d$. It employs a logarithmic scale, while the earlier error $e_a(n)$, defined in FIG. 3, employs a linear scale.

Then, from (24), $$e(n) = \overline{\phi}(n) - \overline{\phi}(n-1) + \psi e_d(n-1) \tag{26}$$

This expression shows that the power error, $e(n)$, is determined by two factors:
1. The variance in the channel power fading, $\overline{\phi}(n) - \overline{\phi}(n-1)$.
2. The quantization noise $e_d(n)$.

Observe that the linear relation (26) is valid in the logarithmic scale.

In the following two subsections, we proceed to derive expressions for the mean and variance of $e(n)$. To do so, we make the following assumptions:

A.1. $e_d(n)$ is a uniformly distributed random variable in $$\left[-\frac{\Delta}{2}, \frac{\Delta}{2}\right].$$

A.2. All random processes are stationary and independent of each other.

D. Mean and Variance Analysis

Let us take the expected value of both sides of (26), i.e., $$E\{e(n)\} = E\{\overline{\phi}(n)\} - E\{\overline{\phi}(n-1)\} + \psi E\{e_d(n-1)\} \tag{27}$$

Based on the stationarity assumption, at steady state, we write $$E\{\overline{\phi}(n)\} = E\{\overline{\phi}(n-1)\} \triangleq E_{\overline{\phi}}$$

Also, since $E\{e_d(n-1)\} = 0$, we conclude that $$E_e \triangleq E\{e(n)\} = 0 \tag{28}$$

To evaluate the variance of $e(n)$, let us square both sides of (26) as follows:

$$e^2(n) = (\overline{\phi}(n) - \overline{\phi}(n-1))^2 + 2(\overline{\phi}(n) - \overline{\phi}(n-1))\psi e_d(n-1) + \psi^2 e_d^2(n-1) \tag{29}$$

Using the uncorrelatedness assumption A.1:

$$E\{(\overline{\phi}(n) - \overline{\phi}(n-1))\psi e_d(n-1)\} = 0 \tag{30}$$

we find that $$E\{e^2(n)\} = E\{(\overline{\phi}(n) - \overline{\phi}(n-1))^2\} + \psi^2 E\{e_d^2(n-1)\} \tag{31}$$

When the uniformity assumption A.2 on the quantization noise $e_d(n)$ is reasonable, we further have $$E\{e_d^2(n-1)\} = \int_{\frac{\Delta}{2}}^{\frac{\Delta}{2}} \frac{1}{\Delta} x^2 dx = \frac{\Delta^2}{12} \tag{32}$$

so that the power error variance can be expressed as $$E\{e^2(n)\} = E\{(\overline{\phi}(n) - \overline{\phi}(n-1))^2\} + \psi^2 \frac{\Delta^2}{12} \tag{33}$$

Lemma 1 (Power Control Error) For the CLPC scheme of FIG. 3, the power control error $e(n) = \overline{P_r}(n) - \overline{P_d}$ is zero mean while its variance is given by (31). When the uniformity assumption on the quantization noise is reasonable, the error variance is reduced to (33).

E. Effect of the Choice of $\alpha$

Referring to the companded delta modulator structure of FIG. 4, we see that there are some restrictions on the choice of the positive quantity $\alpha$.

Clearly, $\alpha$ cannot be less than unity since it will then expand (instead of compress) the input to the delta modulator. This will result in slope overload, in which the delta modulator cannot cope with the large variations in the input. Furthermore, $\alpha$ cannot be unity since this choice has no meaning and will make the system functionless ($P_r(n) = P_r(n-1)$). The larger than unity $\alpha$ is, the less slope overload there is in the system (which makes the tracking easier for the delta modulator). However, from (26), increasing $\alpha$ will increase the power tracking error thus putting a limitation on how large can $\alpha$ be. In summary, the best choice for $\alpha$ should be the one that comprises the increase in compression to the delta modulator input and the decrease in the power tracking error.

To see the effect of $\alpha$ on the power control error, we choose a certain Doppler frequency $f_D$, which is the width of the Doppler power spectrum of the wireless channel. The Doppler frequency and the delay spread of the channel are reciprocally related.

Figure 5:
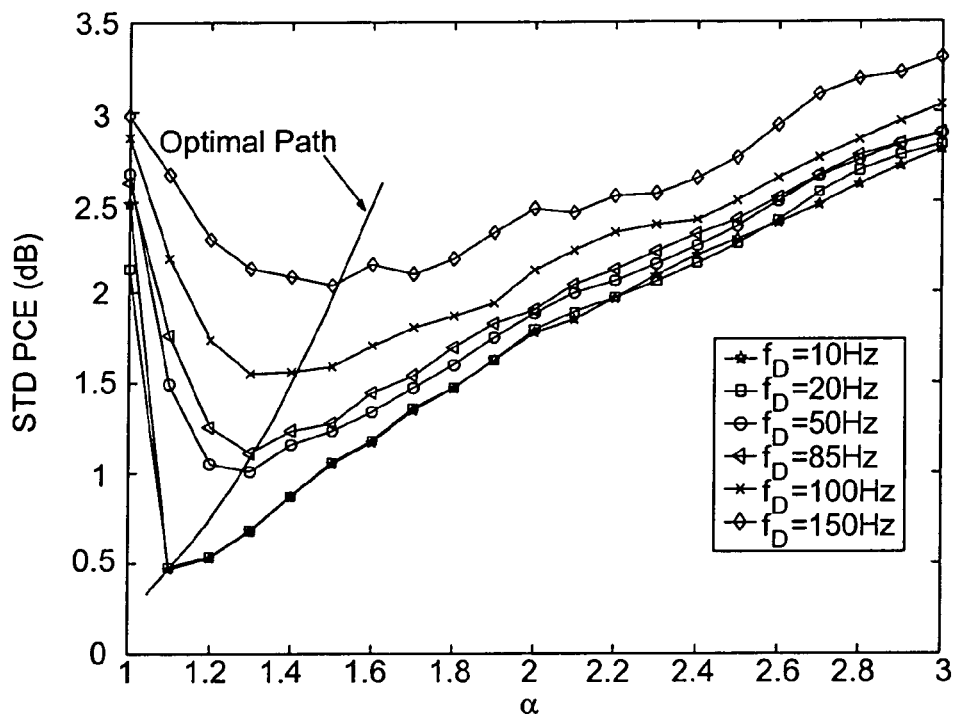
FIG. 5 is a graph showing the performance of a conventional CLPC versus $\alpha$ for different Doppler frequencies.

This information is then used to generate the corresponding multipath gains. The power fading $\phi(n)$ is then computed from (3) and (5). We also choose a value for the exponent term $\alpha$ and we run a simulation implementing the CLPC of FIG. 3. The standard deviation of the error $e(n)$ is measured. The values of $f_D$ and $\alpha$ are then changed and the standard deviation is measured again. The result is shown in FIG. 5, which illustrates the performance of conventional CLPC versus $\alpha$ for different Doppler frequencies. This figure shows that the optimal choice of $\alpha$ lies in the interval from 1 to 2. The heavy solid curve indicates the optimal path of $\alpha$ as a function of $f_D$.

In addition, considering the power error variance expression (31), a strong matching between analytical and simulation results was observed. This expression assumes however that the second moment of the quantization error $e_d(n)$ can be well estimated. The second expression for the error variance shown in (33) is more specific to the case where the uniformity assumption of the quantization error is reasonable by proper choice of $\alpha$ (the uniformity assumption is dependent on the amount of slope overload of the delta modulator, which is controlled by $\alpha$).

Figure 6:
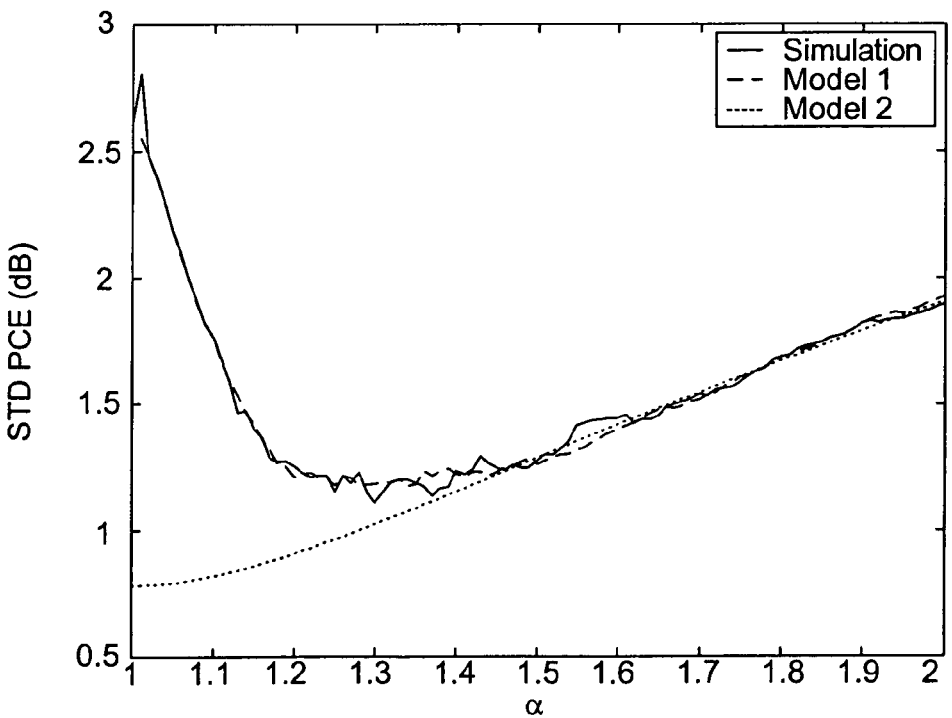
FIG. 6 is a graph showing the comparison between the analytical power error variances of equations (31) (Model 1) and (33) (Model 2) with the simulation results.

FIG. 6 shows a comparison between the simulation and analytical results of the power control error standard deviation with $f_D=85$ Hz. The curve associated with equation (31) shows a strong match to the simulation results for all $1<\alpha<2$. On the other hand, the curve associated with equation (33) matches simulation results only at large enough $\alpha$'s, as expected. This supports our conclusion that equation (33) should be used only if the uniformity assumption holds. Otherwise, equation (31) should be used with a more accurate characterization of $e_d(n)$.

III. Oversampled Channel Prediction

In the next section, we shall develop several method for CLPC. Most of these methods will require a prediction for the channel power fading $\phi(n)$. In this section, we describe a method for predicting $\phi(n)$. The method is based on oversampling the received power variations at the BS. Then an adaptive predictor, for example, a NLMS-based (normalized-least-mean-square) filter or any other similar adaptive filter, is used to estimate the channel fading one-step ahead. For this purpose, we assume that the BS knows the transmission power $P_t(n)$ of the MS at each time instant. This assumption is reasonable in CLPC since the BS can compute $P_t(n)$ from the information sent to the MS.

Figure 7:
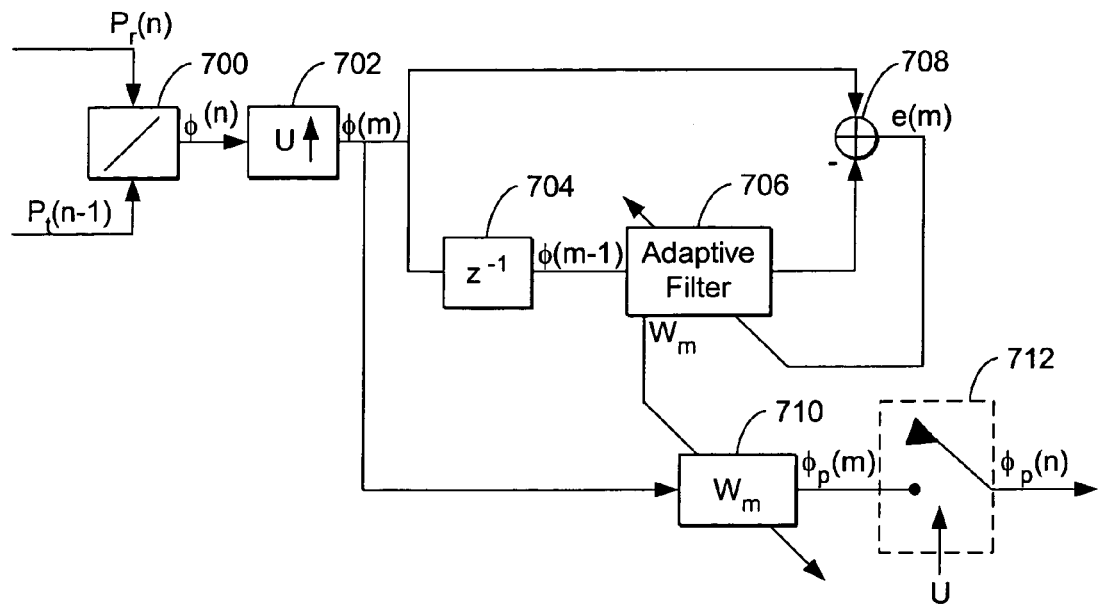
FIG. 7 illustrates the structure used for power fading prediction.

FIG. 7 shows the structure for implementing the proposed power fading prediction method, including divider 700, up-sampler block 702, delay 704, adaptive filter 706, summing junction 708, finite impulse response (FIR) filter 710, and down-sampler block 712.

In this structure, the measured received power $P_r(n)$ is divided by $P_t(n-1)$ to get the power channel fading or power attenuation $\phi(n)$, i.e., $$\phi(n) = \frac{P_r(n)}{P_t(n-1)} \quad (34)$$

The signal $\phi(n)$ is then up-sampled by a factor of U resulting in $\phi(m)$, where m refers to the oversampling index. This can be achieved by increasing the sampling rate of the received power and by assuming that the transmission power is constant between two consecutive samples of $P_r(n)$.

The signal $\phi(m)$ is then passed through a delay as shown in FIG. 7. The delayed samples of $\phi(m-1)$ are fed into an adaptive filter of order M. The output of the adaptive filter is compared to $\phi(m)$. The comparison error is fed back to the adaptive filter for online training. The taps, $W_m$, of the adaptive filter extract the correlation between the fading samples. The tap values are carried out online and used to adapt the taps of an FIR (finite impulse response) filter as shown in the figure. The input to this FIR filter is $\phi(m)$ and its output is the prediction of $\phi(m+1)$ denoted by $\phi_p(m+1|m)$. This signal is then down-sampled by the factor U to produce the required prediction value $$\phi_p(n+1|n) \approx \phi(n+1) \quad (35)$$

The NLMS algorithm can be used here to update the weight vector W.

The performance of this predictor is dependent on many factors such as the filter type, order, and step-size. Furthermore, the oversampling factor U plays a significant role in the performance of the predictor since it increases the correlation between the samples of $\phi(m)$.

It should be noticed here that increasing U will introduce noise in the measured $P_r(n)$ resulting in degradation in performance. This usually sets an upper limit for choosing U. We found through simulations that $U \leq 5$ is an acceptable choice.

Figure 8:
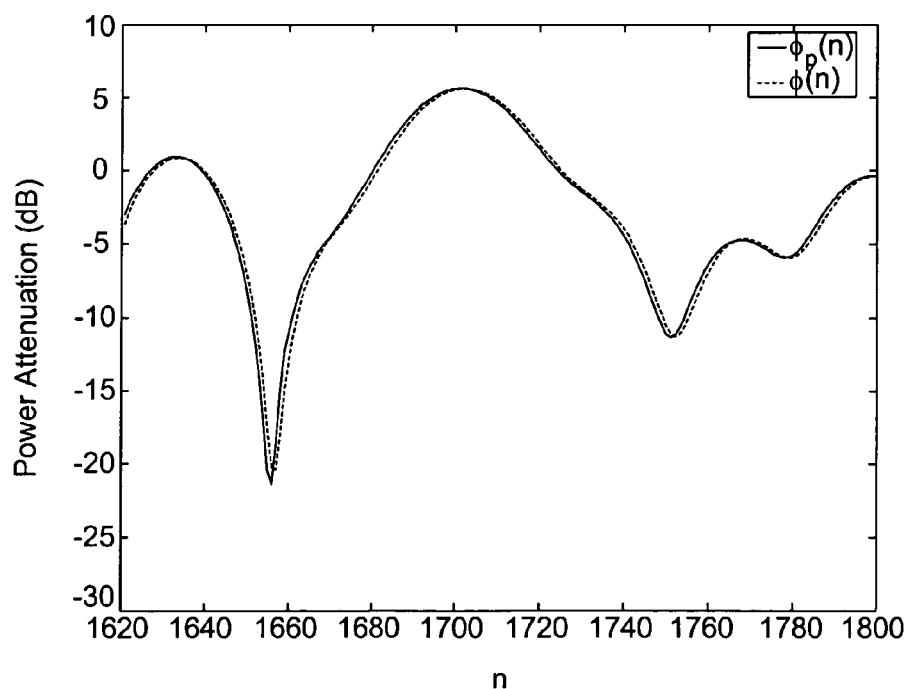
FIG. 8 is a graph showing the time response of the channel attenuation and its prediction for a Rayleigh fading channel.

FIG. 8 shows an attenuation curve $\phi(n)$ resulting from a Rayleigh fading channel together with its predicted value $\phi_p(n+1|n)$.

Figure 9:
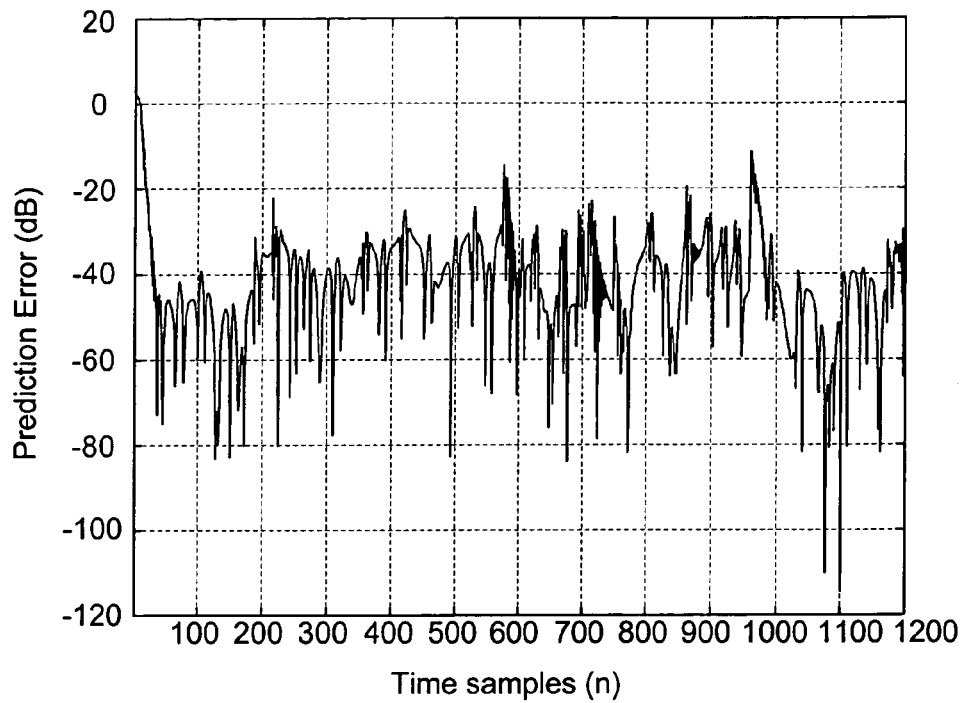
FIG. 9 is a graph showing the prediction error over time for a Rayleigh fading channel with $f_D=50$ Hz and with U=1.
Figure 10:
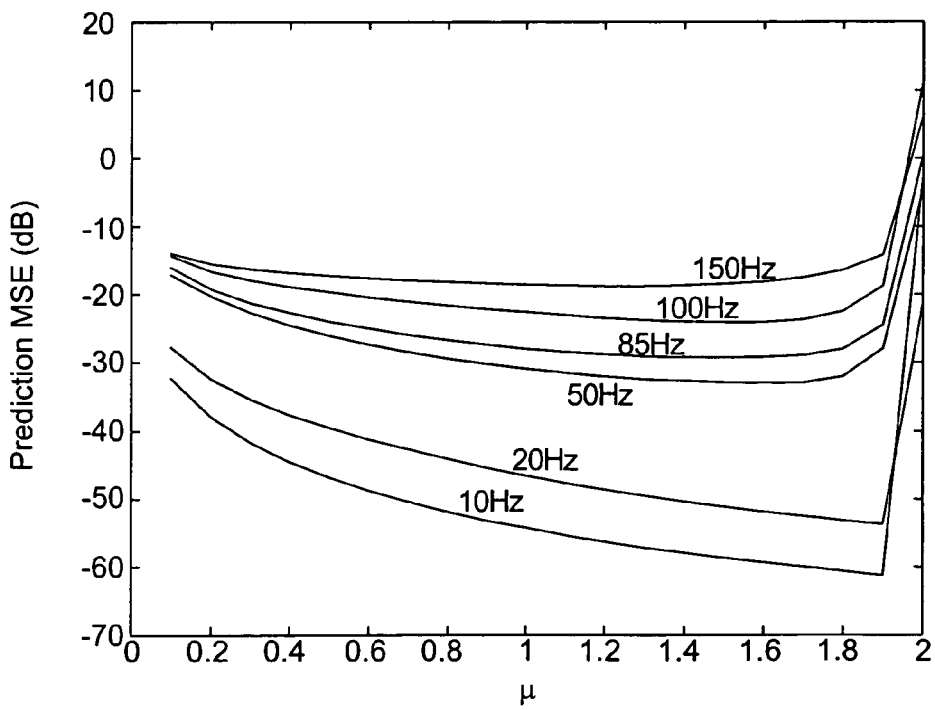
FIG. 10 is a graph showing the effect of the step-size $\mu$ on prediction MSE for different Doppler frequencies.
Figure 11:
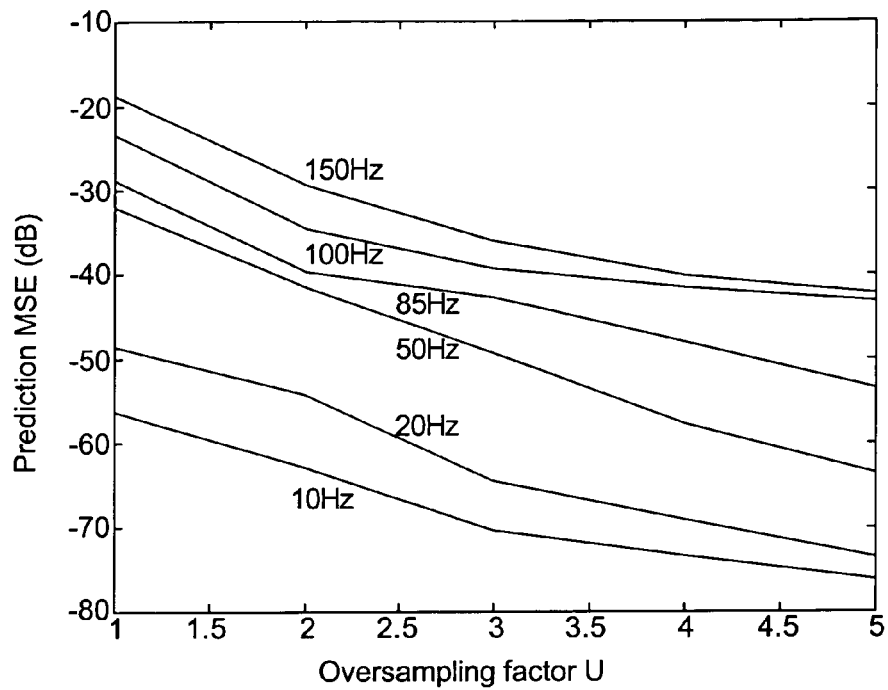
FIG. 11 is a graph showing the prediction MSE as a function of the oversampling factor U for different Doppler frequencies.

FIG. 9 shows a plot of the prediction error $e_{pr}=\phi_p(n+1|n)-\phi(n+1)$ over time for a Rayleigh fading channel with $f_D=50$ Hz, $U=1$, and $\mu=1.8$. The error decays to $-40$ dB and stays under $-30$ dB for most of the simulation time. In FIG. 10, we show the prediction mean square error $E\{e_{pr}^2\}$ (MSE) versus the step-size $\mu$. The MSE can be further reduced by increasing the oversampling factor U. In FIG. 11, the MSE is shown as a function of U for different $f_D$'s and for $\mu=1.2$.

IV. New Adaptive Methods for Closed Loop Power Control

We derived an expression for the power control error (PCE) of the conventional IS-95 closed loop power control (CLPC). In particular, we showed that the power error function, in dB, is given by $$e(n) \triangleq \bar{P}_r(n) - \bar{P}_d = \bar{\phi}(n) - \bar{\phi}(n-1) + \psi e_d(n-1) \quad (36)$$

wherein:

$\bar{P}_r(n) = 10 \log_{10} P_r(n) = 10 \log_{10}(\phi(n)P_t(n-1))$: received power at the BS in dB, $\bar{P}_d = 10 \log_{10} P_d$: desired power in dB, $\bar{\phi}(n) = 10 \log_{10} \phi(n)$: power fading caused by the channel in dB, $\psi = 10 \log_{10} \alpha$: increment in transmission power in dB, $P_t(n)$: transmitted power by the MS, $e_d(n)$: quantization error, $\psi = 10 \log_{10} \alpha$: increment in transmission power in dB, and $\alpha$: the increment in transmission power in dB.

Expression (36) shows that the sign of the power control error, $e(n)$, is affected by two factors:

1. The variation in the channel fading power, namely $\bar{\phi}(n) - \bar{\phi}(n-1)$ where from (3)-(5):

$$\phi(n) \triangleq \frac{1}{T_P} \int_{(n-1)T_P}^{nT_P} \left[ \sum_{P=0}^{L-1} a_P^2(t) \right] dt \quad (37)$$

and $a_p(t)$ denotes the p th tap of the fading channel at time t. Moreover, $T_p$ is the power control period and $$\bar{\phi}(n) = 10 \log_{10} \phi(n) \; (dB)$$

2. The quantization noise, $e_d(n)$, that is introduced by the one-bit quantizer of FIG. 3. The noise is generally assumed to be uniformly distributed in an interval $$\left[ -\frac{\Delta}{2}, \frac{\Delta}{2} \right],$$

where $\Delta$ is the step-size of the quantizer.

These facts suggest new strategies for reducing the power control error $e(n)$, and consequently improving the performance of the closed loop power control mechanism. In the following, we propose three strategies.

1. Predictive Power Control: In this scheme, the control law leads to expression (36) with $\bar{\phi}(n-1)$ replaced by the one-step prediction of $\bar{\phi}(n)$; i.e., $\bar{\phi}(n-1)$ is replaced by $\bar{\phi}_p(n|n-1)$. We will see that this can be achieved by introducing a certain ratio block at the BS receiver. In this way, we replace the term $\bar{\phi}(n-1)$ in (36) by one that is closer in value to $\bar{\phi}(n)$. The error can be further reduced by using a variable α (or ψ) depending on the variation in the channel fading.

2. Inverse Power Control: The basic principle here is not to provide the MS with commands to increase or decrease its power according to how far its transmitted power is from the reference level point. Instead, the idea is for the BS to estimate what the transmitted power should be for the next period of time and to provide this value directly (in coded form) to the MS.

3. Error Coding Power Control: In the conventional scheme of FIG. 3, it is only the sign of the error signal $$e_a(n)=P_d-P_r(n)$$

that is transmitted to the MS. More information about $e_a(n)$ can be transmitted to the MS than just its sign. This can be achieved by implementing a more advanced coding algorithm. The MS will then use this extra information to improve the performance of the control loop.

V. Predictive Power Control

We begin by discussing the first method of predictive control. Two algorithms are proposed in this section.

A. Algorithm 1: Predictive Ratio CLPC (PR-CLPC)

Figure 12:
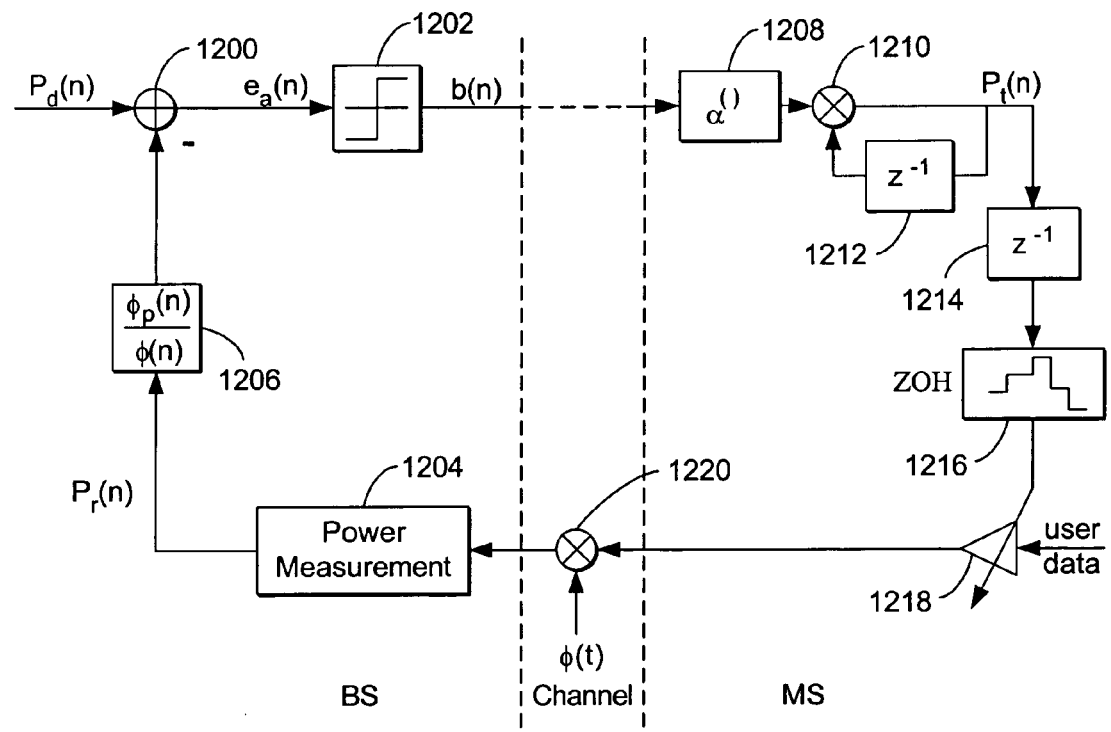
FIG. 12 is a block diagram of a Predictive Ratio Closed Loop Power Control (PR-CLPC)

In this algorithm, we end up replacing $\bar{\phi}(n-1)$ by $\bar{\phi}_p(n|n-1)$. The block diagram of the proposed scheme is shown in FIG. 12, wherein the BS includes a summing junction 1200, single bit quantizer 1202, power measurement block 1204, and a ratio block 1206, and the MS includes an exponential term block 1208, multiplier 1210, delays 1212 and 1214, zero-order hold 1216, and selectable power adapter 1218. The channel between the BS and MS acts as a multiplier 1220 between the signal transmitted by the MS and the channel power fading $\phi(t)$.

As shown, the only modification to the conventional CLPC of FIG. 3 is the introduction of the ratio block $$\frac{\phi_p(n+1|n)}{\phi(n)}.$$

This will cancel the fading $\phi(n)$ caused by the channel and replace it by the prediction $\phi_p(n+1|n)$. Everything else is the same as in the conventional CLPC of FIG. 3.

If we follow the same derivation as in Sections II-B and II-C, we can verify that $$P_t(n) = \frac{P_d}{\phi_p(n+1|n)} K(n) \tag{38}$$

so that the received power is now given by $$P_r(n) = \phi(n) P_t(n-1) = \frac{\phi(n)}{\phi_p(n|n-1)} P_d(n-1) K(n-1) \tag{39}$$

If we take the logarithm of both sides, as we did in Section II-C, we get $$\bar{P}_r(n)=\bar{\phi}(n)-\bar{\phi}_p(n|n-1)+\bar{P}_d+\bar{K}(n-1) \tag{40}$$

In other words, $$\bar{P}_r(n)=\bar{\phi}(n)-\bar{\phi}_p(n|n-1)+\bar{P}_d+\psi e_d(n-1) \tag{41}$$

and, hence, the power error is now given by $$e(n)=\bar{\phi}(n)-\bar{\phi}_p(n|n-1)+\psi e_d(n-1) \tag{42}$$

Figure 13:
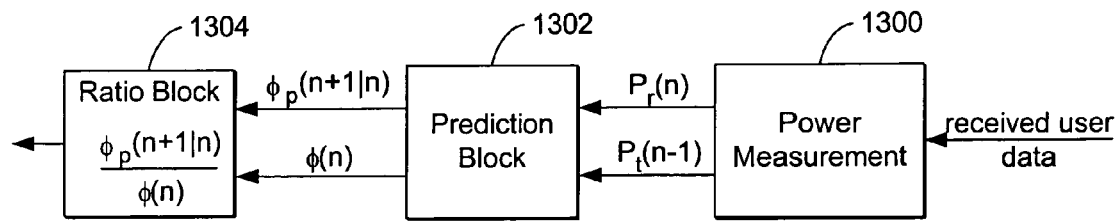
FIG. 13 illustrates the structure used for evaluation of the predictive ratio, wherein the prediction scheme is the one of FIG. 6.

Notice that the only difference between (36) and (42) is that the term $\bar{\phi}(n-1)$ is replaced by $\bar{\phi}_p(n|n-1)$. The power error is now dependent on the difference $[\bar{\phi}(n)-\bar{\phi}_p(n|n-1)]$ instead of $[\bar{\phi}(n)-\bar{\phi}(n-1)]$, as is conventional CLPC. Since for reasonable prediction, $\bar{\phi}_p(n|n-1)$ is usually closer to $\bar{\phi}(n)$ than $\bar{\phi}(n-1)$, we expect this algorithm to result in lower PCE. The prediction term $\bar{\phi}_p(n+1|n)$ can be evaluated by resorting to the scheme of FIG. 7. In this way, the power measurement and ratio blocks on the left-hand side of FIG. 12 (at BS side) can be more explicitly detailed as shown in FIG. 13, wherein the received user data is input to power measurement block 1300, which outputs signals $P_r(n)$ and $P_r(n-1)$, which are input to prediction block 1302, which outputs signals $\phi_p(n+1|n)$ and $\phi(n)$, which are input to ratio block 1304.

We can still evaluate the mean and variance of the power error by following the same procedure and same assumptions as in the conventional case of Section II-C. The error mean is given by $$E\{e(n)\}=E\{\bar{\phi}(n)\}-E\{\bar{\phi}_p n|n-1)\}+\psi E\{e_d(n-1)\}=0 \tag{43}$$

and the error variance is $$E\{e^2(n)\}=E\{(\bar{\phi}(n)-\bar{\phi}_p n|n-1))^2\}+\psi^2 E\{e_d^2(n-1)\} \tag{44}$$

Again, when the uniformity assumption on the quantization noise $e_d(n)$ is reasonable, we get $$E\{e^2(n)\} = E\{(\bar{\phi}(n) - \bar{\phi}_p(n|n-1))^2\} + \psi^2 \frac{\Delta}{12} \tag{45}$$

Therefore, the variance of the PCE is now dependent on the second moment $E\{(\bar{\phi}(n)-\bar{\phi}_p(n|n-1))^2\}$ and not on $E\{(\bar{\phi}(n)-\bar{\phi}(n-1))^2\}$, as in the conventional case. Thus, any prediction with acceptable accuracy will improve the power control error.

The PR-CLPC algorithm is summarized in Table I below:

TABLE I

Summary of the Predictive Ratio CLPC (PR-CLPC) algorithm

Initialization:

Choose the desired received power $P_d$.
Choose α and evaluate ψ from (11).
Choose the prediction parameters:
Filter order, μ, and U.
For every CLPC time sample n > 0 do:

BS:

1. Measure $P_r(n)$ from the received sequence.
2. Knowing $P_r(n-1)$, estimate $\phi(n)$.
3. Evaluate $\phi_p(n+1|n)$.

4. Multiply $P_r(n)$ by $\dfrac{\phi_p(n+1|n)}{\phi(n)}$.

TABLE I-continued

Summary of the Predictive Ratio CLPC (PR-CLPC) algorithm

| | |
|---|---|
| 5. | Compare the result with $P_d$: |
| | if $P_r(n)\dfrac{\phi_p(n+1\mid n)}{\phi(n)} > P_d$ |
| | then $b(n) = 1$ |
| | else $b(n) = -1$ |
| | end |
| 6. | Send $b(n)$ to the MS. |
| MS: | |
| 7. | Extract $b(n)$ from the received data. |
| 8. | If $b(n) = 1$, |
| | then increment $P_t(n)$ by $\psi$dB |
| | else decrement $P_t(n)$ by $\psi$dB |
| | end. |

B. Algorithm 2: Adaptive Predictive Ratio CLPC (APR-CLPC)

This algorithm is an extension to the Predictive Ratio CLPC algorithm. Here, we use an adaptation technique to vary the exponent term α (which determines the value of ψ). The motivation behind this algorithm is the following. When the power fading variations are small, the predictor performs well. Therefore, we can decrease α to further decrease the power error of (36). When the variations are large, α is increased to boost the tracking capabilities of the power control loop. The adaptation scheme used for α is $$\alpha(n) = \alpha(n-1) + \lambda(n)C \quad (46)$$

where C is a positive constant, usually C<1 (e.g., C=0.2). The signal λ(n) is chosen as follows:

$$\lambda(n) = \begin{cases} +1 & \text{if} \quad b(n) = b(n-1) = b(n-2) \\ -1 & \text{if} \quad b(n) \neq b(n-1) \\ 0 & \text{otherwise.} \end{cases} \quad (47)$$

Furthermore, the exponent term α(n) is limited by lower and upper bounds, i.e., $$\alpha(n) = \begin{cases} \alpha_{max} & \text{if} \quad \alpha(n) > \alpha_{max} \\ \alpha_{max} & \text{if} \quad \alpha(n) < \alpha_{min} \end{cases} \quad (48)$$

The bounds $\alpha_{max}$ and $\alpha_{min}$ are chosen in the interval (1,3] (e.g., $\alpha_{max}$=2.5, $\alpha_{min}$=1.1).
The step change of $P_t(n)$ in dB is $$\psi(n) = 10\log_{10}\alpha(n) \quad (49)$$

The APR-CLPC algorithm is summarized in Table II below:

TABLE II

Summary of the Adaptive Predictive Ratio CLPC (APR-CLPC) algorithm

Initialization:

Choose the desired received power $P_d$.
Choose the adaptation parameters:
C, $\alpha_{max}$ and $\alpha_{min}$.
Choose the prediction parameters:
Filter order, μ, and U.

TABLE II-continued

Summary of the Adaptive Predictive Ratio CLPC (APR-CLPC) algorithm

For every CLPC time sample n > 0 do:

| | |
|---|---|
| BS: | |
| 1. | Measure $P_r(n)$ from the received sequence. |
| 2. | Knowing $P_t(n-1)$, estimate φ(n). |
| 3. | Evaluate $\phi_p(n+1\mid n)$. |
| 4. | Multiply $P_r(n)$ by $\dfrac{\phi_p(n+1\mid n)}{\phi(n)}$. |
| 5. | Compare the result with $P_d$: |
| | if $P_r(n)\dfrac{\phi_p(n+1\mid n)}{\phi(n)} > P_d$ |
| | then $b(n) = 1$ |
| | else $b(n) = -1$ |
| | end |
| 6. | Send $b(n)$ to the MS. |
| MS: | |
| 7. | Extract $b(n)$ from the received data. |
| 8. | From $b(n-i)$, $i = 0, 1, 2$, compute λ(n). |
| 9. | From (46) and (49) compute α(n) and ψ(n). |
| 10. | If $b(n) = 1$, |
| | then increment $P_t(n)$ by ψ(n)dB |
| | else decrement $P_t(n)$ by ψ(n)dB |
| | end. |

VI. Inverse Power Control

We now describe two algorithms for power control that rely on inverse control ideas. The basic principle here is not to provide the MS with commands to increase or decrease its power according to how far its transmitted power is from the reference level point. Instead, the idea is for the BS to estimate what the transmitted power should be for the next period of time and to provide this value directly (in coded form) to the MS.

Figure 14:
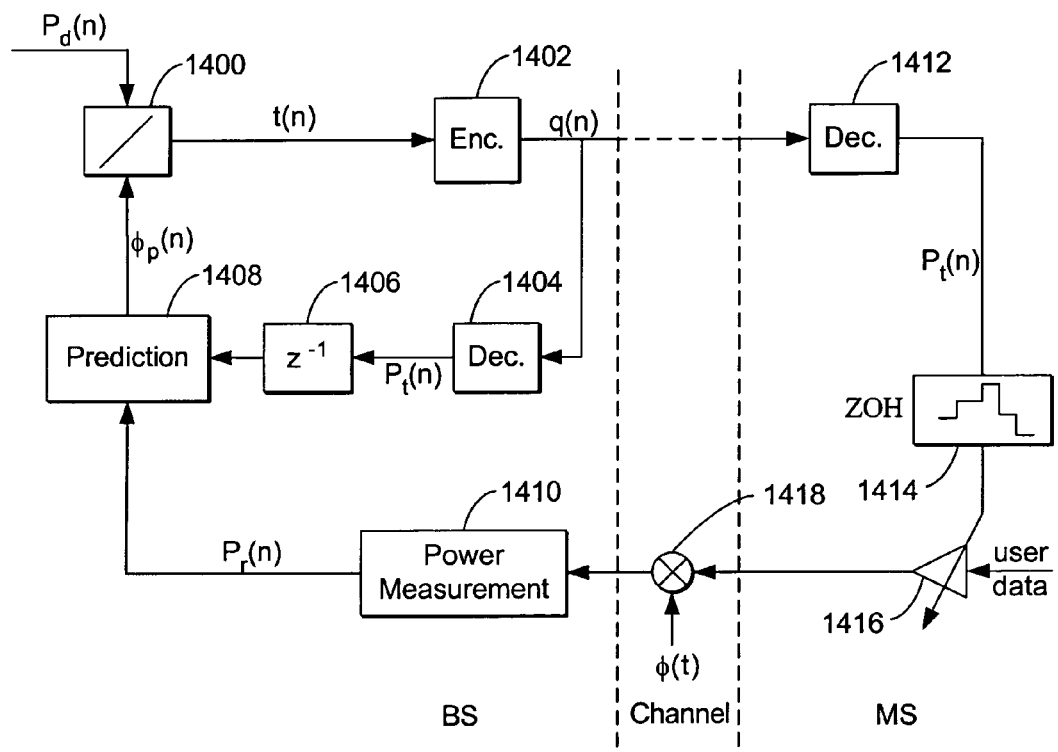
FIG. 14 is a block diagram of a Direct Inverse Closed Loop Power Control (DI-CLPC)

A. Algorithm 1: Direct Inverse CLPC (CI-CLPC) A block diagram of the proposed scheme is shown in FIG. 14, wherein the BS includes a divider 1400, encoder 1402, decoder 1404, delay 1406, prediction block 1408, and power measurement block 1410, and the MS includes a decoder 1412, zero-order hold 1414, and selectable power control 1416. The channel between the BS and MS acts as a multiplier 1418 between the signal transmitted by the MS and the channel power fading φ(t).

In FIG. 14, the power control process works as follows. The BS measures the received power $P_r(n)$ from the bit stream arriving at its end. Then, the MS transmission power $P_t(n-1)$ and $P_r(n)$ are fed to the prediction block, which produces $\phi_p(n+1\mid n)$ as in FIG. 13. The BS estimates the transmission power that should be used by the MS as $$\hat{P}_t(n) = \frac{P_d}{\phi_d(n+1\mid n)} \quad (50)$$

This information is to be transmitted to the MS. Since we are limited by the power bit rate, $\hat{P}_t(n)$ should be coded to meet this rate.

The coding scheme used to transmit $\hat{P}_t(n)$ could be the adaptation part of the ADM described in [12]. This coder exhibits strong tracking, good stability, and high dynamic range.

Figure 15:
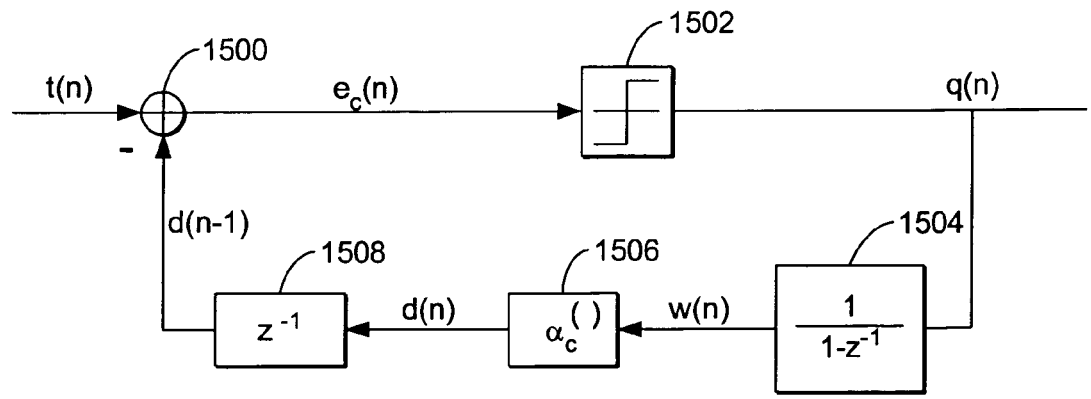
FIG. 15 is a block diagram of a coding scheme used in the Direct Inverse CLPC.

FIG. 15 shows a block diagram of this coding scheme, which includes a summing junction 1500, single bit quantizer 1502, integrator 1504, exponential term block 1506, and delay 1508. The equations describing the dynamics of the coder are:

$$e_c(n) = \hat{P}_t(n) - d(n-1), \quad d(0) = d_0$$

$$q(n) = \text{sign}[e_c(n)]$$

$$w(n) = w(n-1) + q(n), \quad w(0) = 0$$

$$d(n) = \alpha_c^{w(n)} \qquad (51)$$

In this algorithm, the term $\alpha_c$ denotes the coding exponent (the subscript c is added to distinguish it from the $\alpha$ used in the previous algorithms).

The DI-CLPC algorithm is summarized in Table III below:

TABLE III

Summary of the Direct Inverse CLPC (DI-CLPC) algorithm

Initialization:

Choose the desired received power $P_d$.
Choose the coding parameters $\alpha_c$ and d(0).
Choose the prediction parameters:
Filter order, μ, and U.
For every CLPC time sample n > 0 do:

BS:

| | |
|---|---|
| 1. | Measure $P_r(n)$ from the received sequence. |
| 2. | Knowing $P_t(n-1)$, estimate φ(n). |
| 3. | Evaluate $\phi_p(n+1\|n)$. |
| 4. | Code the power data $\hat{P}_t(n) = \dfrac{P_d}{\phi_p(n+1\|n)}$. |
| 5. | Send the coded data q(n) to the MS. |

MS:

| | |
|---|---|
| 6. | Extract q(n) from the received data. |
| 7. | Use q(n) to decode the power data d(n). |
| 8. | Set $P_t(n) = d(n)$. |

B. Algorithm 2: Adaptive Direct Inverse CLPC (ADI-CLPC)

Figure 16:
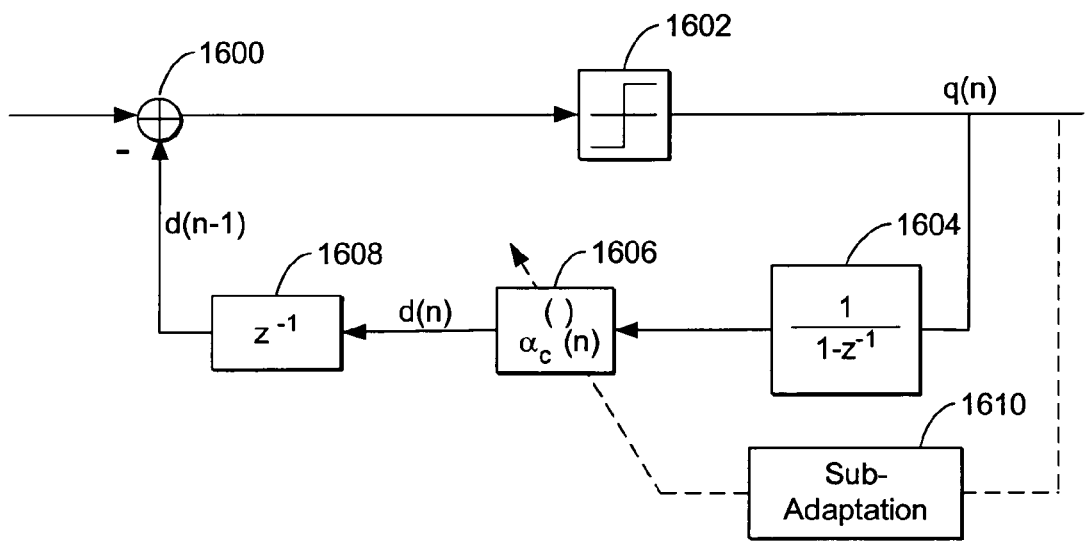
FIG. 16 is a block diagram of a coding scheme used in the Adaptive Direct Inverse CLPC.

In this algorithm, we modify the coding scheme of the DI-CLPC by using an adaptive exponent term $\alpha_c$, as shown in FIG. 16, which includes a summing junction 1600, single bit quantizer 1602, integrator 1604, exponential term block 1606, and delay 1608. Also included is a sub-adaptation block 1610.

The purpose of adapting $\alpha_c$ is similar to that in the APR-CLPC algorithm, namely, to cope with large variations in the channel power fading. Moreover, the same adaptation technique for $\alpha$ used in APR-CLPC is adopted here, i.e., $$\alpha_c(n) = \alpha_c(n-1) + \lambda(n)C \qquad (52)$$

where $$\lambda(n) = \begin{cases} +1, & \text{if } q(n) = q(n-1) \text{ and } q(n-2) \\ -1, & \text{if } q(n) \neq q(n-1) \\ 0, & \text{otherwise} \end{cases} \qquad (53)$$

and $$\alpha(n) = \begin{cases} \alpha_{\max} & \text{if } \alpha(n) > \alpha_{\max} \\ \alpha_{\max} & \text{if } \alpha(n) < \alpha_{\min} \end{cases} \qquad (54)$$

with typical values C=0.2, $\alpha_{max}$=2.5, and $\alpha_{min}$=1.1 The ADI-CLPC algorithm is summarized in Table IV below:

TABLE IV

Summary of the Adaptive Direct Inverse CLPC (ADI-CLPC) algorithm

Initialization:

Choose the desired received power $P_d$.
Choose the prediction parameters:
Filter order, μ, and U.
Choose the adaptation parameters:
C, $\alpha_{max}$ and $\alpha_{min}$.
For every CLPC time sample n > 0 do:

BS:

| | |
|---|---|
| 1. | Measure $P_r(n)$ from the received sequence. |
| 2. | Knowing $P_t(n-1)$, estimate φ(n). |
| 3. | Evaluate $\phi_p(n+1\|n)$ |
| 4. | Compute λ(n) and $\alpha_c(n)$ from (52) and (53). |
| 5. | Use $\alpha_c(n)$ to code $\hat{P}_t(n) = \dfrac{P_d}{\phi_p(n+1\|n)}$ |
| 6. | Send the coded data q(n) to the MS. |

MS:

| | |
|---|---|
| 7. | Extract q(n) from the received data. |
| 8. | Use (52) and (53) to recompute $\alpha_c(n)$. |
| 9. | Decode d(n) from q(n) and $\alpha_c(n)$. |
| 10. | Set $P_t(n) = d(n)$. |

C. Algorithm 3: Inverse Estimation CLPC (IE-CLPC)

In FIG. 14, the estimate of the transmitted power, $\hat{P}_t(n)$, is obtained by relying on the prediction scheme of FIG. 7. This scheme utilizes $P_r(n)$ and $P_t(n-1)$, along with upsampling, to evaluate the prediction $\phi_p(n+1|n)$, which is then used to evaluate $\hat{P}_t(n)$.

Alternatively, one could employ a simplified adaptive structure to estimate $$\frac{1}{\phi(n+1)}.$$

More specifically, one could use the same data $\{P_r(n), P_t(n-1)\}$ to train a single-tap adaptive equalizer. A properly designed equalizer would be such that it coefficient tends to a value that could be taken as an approximation for $$\frac{1}{\alpha(n+1)}.$$

Figure 17:
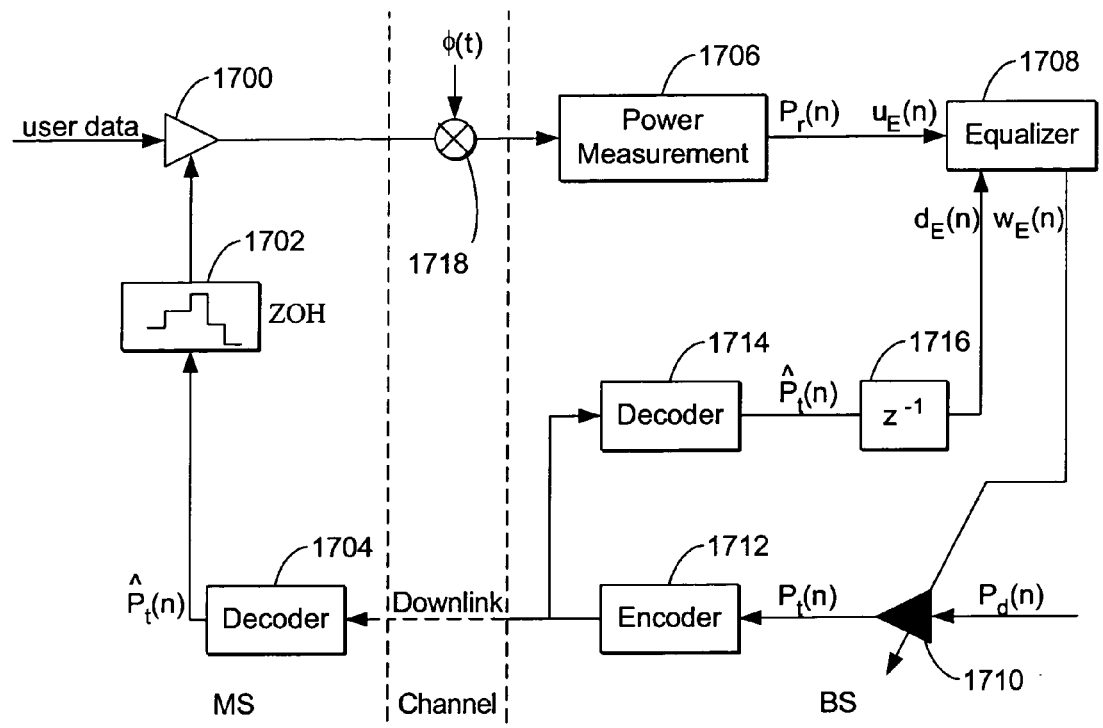
FIG. 17 is a block diagram of a Inverse Estimation Closed Loop Power Control (IE-CLPC)

The structure of the algorithm is illustrated in FIG. 17, wherein the MS includes a power adapter 1700, decoder 1702, and zero-order hold 1704, and the BS includes a power measurement block 1706, single-tap equalizer 1708, selectable power control 1710, encoder 1712, decoder 1714, and delay 1716. The channel between the BS and MS acts as a multiplier 1718 between the signal transmitted by the MS and the channel power fading φ(t).

In FIG. 17, the power measurement block measures the received power $P_r(n)$ averaged over a window duration of one power control period. The purpose of the single-tap equalizer is to estimate the inverse of the power channel. The equalizer could be a single-tap LMS (least-mean-square) filter. The tap $\omega_E(n)$ is adapted according to the rule $$\omega_E(n) = \omega_E(n-1) + \mu u_E(n)(d_E(n) - u_E(n)\omega_E(n-1)) \qquad (55)$$

where $u_E(n)=P_r(n)$ and $d_E(n)=P_t(n-1)$. With a proper choice of the step-size $\mu$, and as time progresses, the adaptive filter tap approximates $$\omega_E(n) \approx \frac{1}{\phi(n+1)} \quad (56)$$

The tap of the equalizer, mimicking the inverse of the channel power, is used as the gain G. The transmission power is then estimated via $$\hat{P}_t(n)=GP_d \quad (57)$$

This information is coded to meet the power control bit rate requirement and transmitted to the MS. The same adaptive coding scheme used in the EC-CLPC algorithm can be used here. The mobile station will then decode the transmission power information and use it as its transmission power. Since the BS knows what the transmission power is at each time, it will feed it to the equalizer for online training.

The IE-CLPC algorithm is summarized in Table V below:

TABLE V

Summary of the Inverse Estimation CLPC (IE-CLPC) algorithm

Initialization:

Choose the desired received power $P_d$.
Choose the equalizer's parameters: Filter order and $\mu$.
Choose a coder.
For every power control time sample n > 0 do:

BS:

1. Measure $P_r(n)$ from the received sequence.
2. Perform 1-tap equalization with input $P_r(n)$ and reference $P_t(n-1)$.
3. Multiply the tap value by $P_d$: [$\hat{P}_t(n) = \omega_E(n)P_d$].
4. Code $\hat{P}_t(n)$.
5. Send the coded data to the MS.

MS:

6. Extract the coded data from the received data.
7. Decode the signal $P_t(n)$.
8. Use $P_t(n)$ directly as the Tx power.

D. Algorithm 4: Optimal Predictive CLPC (OP-CLPC)

There are several other ways in which the transmitted power can be estimated, i.e., in which $\hat{P}_t(n)$ can be computed. Apart from the schemes of FIGS. 14 and 17, we now discuss additional methods that follow by formulating the CLPC problem as a least-mean-squares problem. Thus given a desired power level $P_d$ and a channel attenuation factor $\phi$, we consider the problem of determining the transmitted power $P_t$ that minimizes the mean-square error, i.e., $$\min_{P_t} E|P_d - \phi P_t|^2 \quad (58)$$

A recursive (adaptive) solution for this problem can be expressed as $$\hat{P}_t(n-1)=\hat{P}_t(n-2)+p(n)\phi(n)e_a(n), n \geq 0 \quad (59)$$

where p(n) is the step-size sequence, say $$p(n) = \frac{1}{\delta + |\phi(n)|^2} \quad (60)$$

for some small $\delta$, and $$e_a(n)=P_d-\phi(n)\hat{P}_t(n-2).$$

Advancing time by one step, we get $$\hat{P}_t(n)=\hat{P}_t(n-1)+p(n+1)\phi(n+1)(P_d-\phi(n+1)\hat{P}_t(n-1)) \quad (61)$$

Since p(n+1) and $\phi$(n+1) are not available at time n, these two quantities need to be estimated by predicting p(n) and $\phi$(n) one step ahead. Therefore, the final expression for the transmission power estimate is given by $$\hat{P}_t(n)=\hat{P}_t(n-1)+p_p(n+1|n)\phi_p(n+1|n)(P_d-\phi_p(n+1|n)\hat{P}_t(n-1)) \quad (62)$$

where $p_p(n+1|n)$ and $\phi_p(n+1|n)$ are one-step predictors of p(n) and $\phi$(n), respectively.

Figure 18:
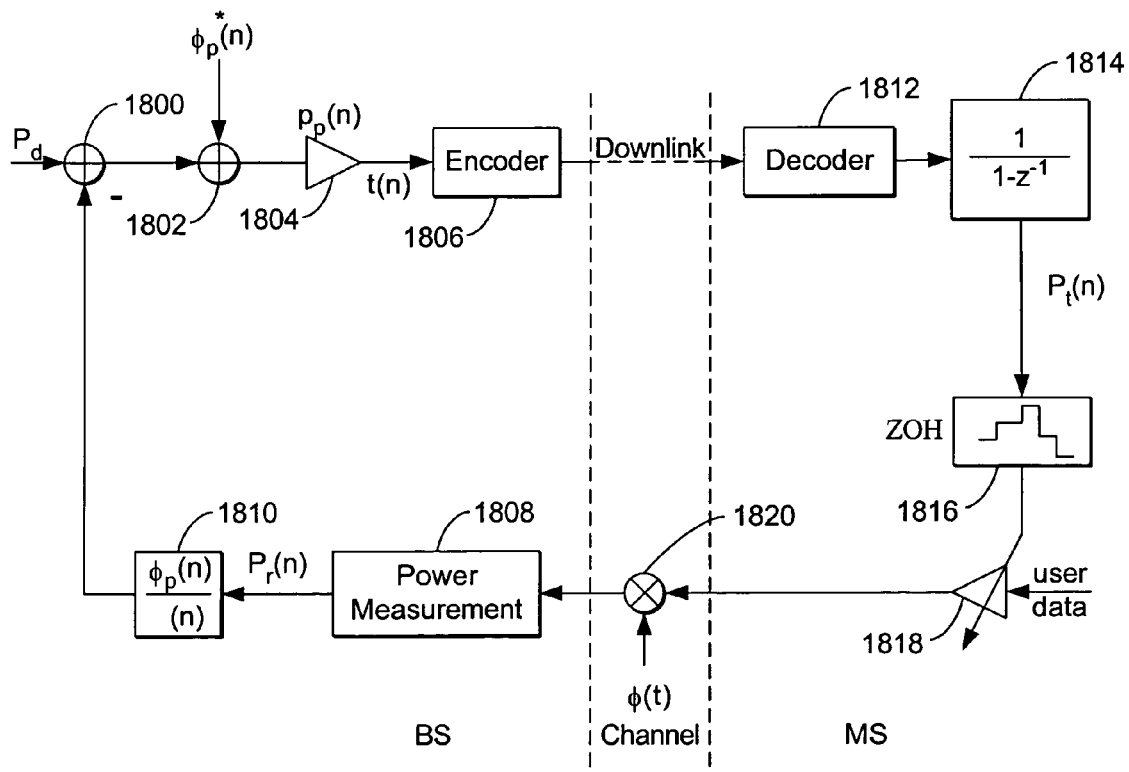
FIG. 18 is a block diagram of an Optimal Predictive Closed Loop Power Control (OP-CLPC)

FIG. 18 shows how the solution proposed by this algorithm can be implemented. The BS includes a summing junction 1800, multiplier 1802, op-amp 1804, encoder 1806, power measurement block 1808, and ratio block $$\frac{\phi_p(n+1|n)}{\phi(n)} 1810,$$

and the MS includes a decoder 1812, integrator 1814, zero-order hold 1816, and selectable power control 1818. The channel between the BS and MS acts as a multiplier 1820 between the signal transmitted by the MS and the channel power fading $\phi$(t).

We notice in this case that the ratio $\phi_p(n+1|n)/\phi(n)$ is multiplied by the received power $P_r(n)$ since $$\frac{\phi_p(n+1|n)}{\phi_n} P_r(n) = \quad (63)$$

$$\frac{\phi_p(n+1|n)}{\phi(n)} \phi(n)P_t(n-1) = \phi_p(n+1|n)P_t(n-1)$$

The OP-CLPC algorithm is summarized in Table VI below:

TABLE VI

Summary of the Optimal Predictive CLPC (OP-CLPC) algorithm

Initialization:

Choose the desired received power $P_d$.
For NLMS topology, choose a small $\delta$.
Choose a coder.
Choose the prediction parameters: Filter order, $\mu$, and U.
For every power control time sample n > 0 do:

BS:

1. Measure $P_r(n)$ from the received sequence.
2. Knowing $P_t(n-1)$, estimate $\phi(n)$.
3. Predict $\phi_p(n+1|n)$.
4. Multiply $P_r(n)$ by $\frac{\phi_p(n+1|n)}{\phi(n)}$.

TABLE VI-continued

Summary of the Optimal Predictive CLPC (OP-CLPC) algorithm

| | |
|---|---|
| 5. | Compare the result with $P_d$. |
| 6. | Multiply the difference by $\phi(n)$. |
| 7. | Multiply the result by the step-size p(n), $\left[\hat{P}_t(n) = \phi(n)p(n)e_a(n)\right]$. |
| 8. | Code the signal $\hat{P}_t(n)$. |
| 9. | Send the coded data to the MS. |
| MS: | |
| 10. | Extract the coded data from the received data. |
| 11. | Decode the signal $P_t(n)$. |

VII. Error Coding Power Control

Now we move to the third class of proposed methods for power control. In conventional CLPC (see FIG. 3), only the sign of error is transmitted from the BS to the MS. We propose in this section a new algorithm, known as Error Coding CLPC (EC-CLPC). This algorithm simply replaces the sign block in conventional CLPC by a more sophisticated encoding/decoding blocks. The purpose of this change is to send more information to the MS about the error than just its sign. This makes the MS increment/decrement its power by amounts proportional to the error signal amplitude.

Figure 19:
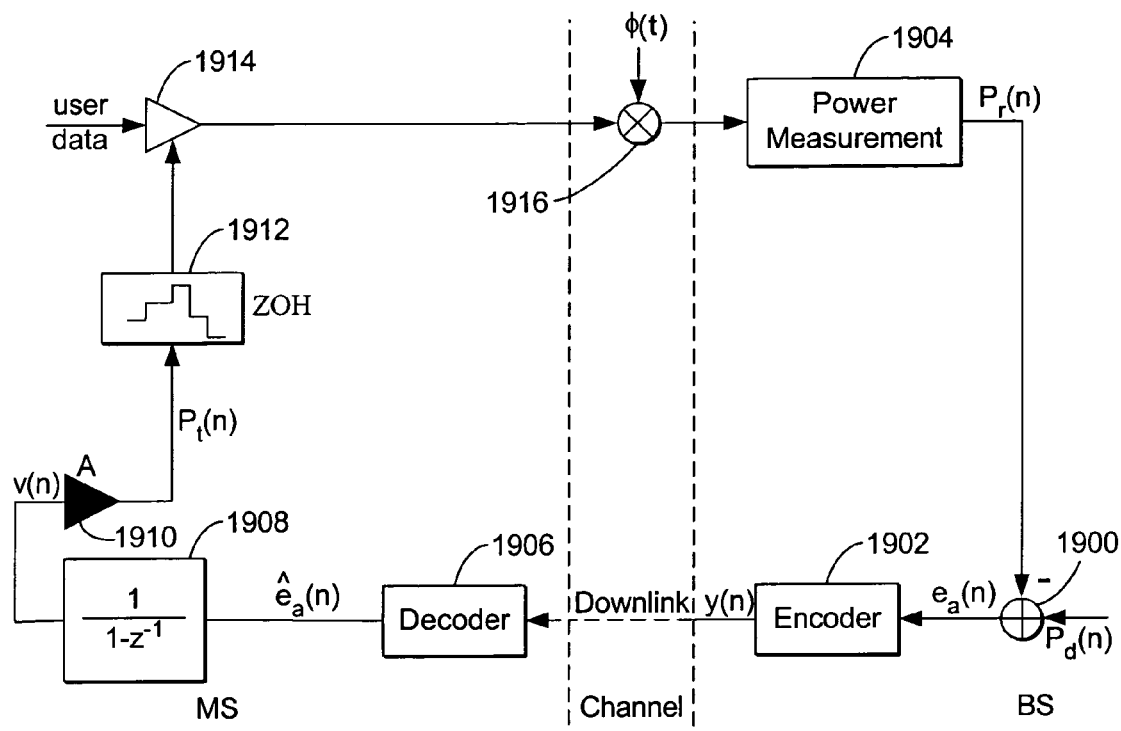
FIG. 19 is a block diagram of an Error Coding Closed Loop Power Control (EC-CLPC)

FIG. 19 illustrates shows how the solution proposed by this algorithm can be implemented. The BS includes a summing junction 1900, encoder 1902, and power measurement block 1904, and the MS includes a decoder 1906, integrator 1908, op-amp 1910, zero-order hold 1912, and power adapter 1914. The channel between the BS and MS acts as a multiplier 1916 between the signal transmitted by the MS and the channel power fading $\phi(t)$.

The closed loop system shown in FIG. 19 looks similar to that of the conventional CLPC of FIG. 1. The new structure replaces the sign block in FIG. 3 by a coding block. The purpose of this block is to encode/decode the value of the error signal $e_a(n)$. The idea is to provide the MS with more information of the error than just its sign b(n).

The power error $e_a(n)$ is coded at the BS using a generic source coder. The output of the coder y(n) is transmitted to the MS. No specific coder will be addressed here and the performance of this algorithm will be dependent on the accuracy of the coder.

At the MS side, the signal y(n) is extracted and then decoded to get the error estimate $\hat{e}_a(n)$. This estimate is then passed through the integration block to compute the transmission power, i.e., $$P_t(n) = P_t(n-1) + \hat{e}_a(n) \quad (64)$$

The EC-CLPC algorithm is summarized in Table VII below.

TABLE VII

Summary of the Error Coding CLPC (EC/CLPC) algorithm

| |
|---|
| Initialization: |
| Choose the desired received power $P_d$. |
| Choose a coder. |
| Choose Tx gain A. |

TABLE VII-continued

Summary of the Error Coding CLPC (EC/CLPC) algorithm

| | |
|---|---|
| For every power control time sample n > 0 do: | |
| BS: | |
| 1. | Measure $P_r(n)$ from the received sequence. |
| 2. | Compare $P_r(n)$ to $P_d$. |
| 3. | Code the difference signal $e_a(n)$. |
| 4. | Send the coded signal to the MS. |
| MS: | |
| 5. | Decode the difference signal $\hat{e}_a(n)$. |
| 6. | Increment $P_t(n)$ by $\hat{e}_a(n)$. |

VIII. Simulations

The algorithms developed in this work have been simulated. The following are the simulation parameters used:

Desired power level $P_d$ 0 dB.

Power bit rate: 1500 Hz.

Up-sampling factor (U): 2.

Channel:

Type: frequency selective multi-path Rayleigh fading.

Taps: 2.

Vehicle speed: variable.

The standard deviation of the power control error is used as a measure of how well the power control algorithms achieve the desired received power. The exponent term α and the prediction step-size μ are chosen as 1.3 and 0.8, respectively, unless otherwise specified. The standard deviations of the PCE obtained from conventional CLPC for different Doppler frequencies are shown in Table VIII for reference.

TABLE VIII

Power control error STD obtained using conventional CLPC

| $f_D$ (Hz) | Vehicle Speed (km/h) | $PCE_{std}$ (dB) |
|---|---|---|
| 10 | 6.7 | 0.5 |
| 20 | 13.3 | 0.7 |
| 50 | 33.3 | 1.0 |
| 85 | 56.7 | 1.2 |
| 100 | 66.7 | 1.5 |
| 150 | 100 | 2.2 |

Figure 20:
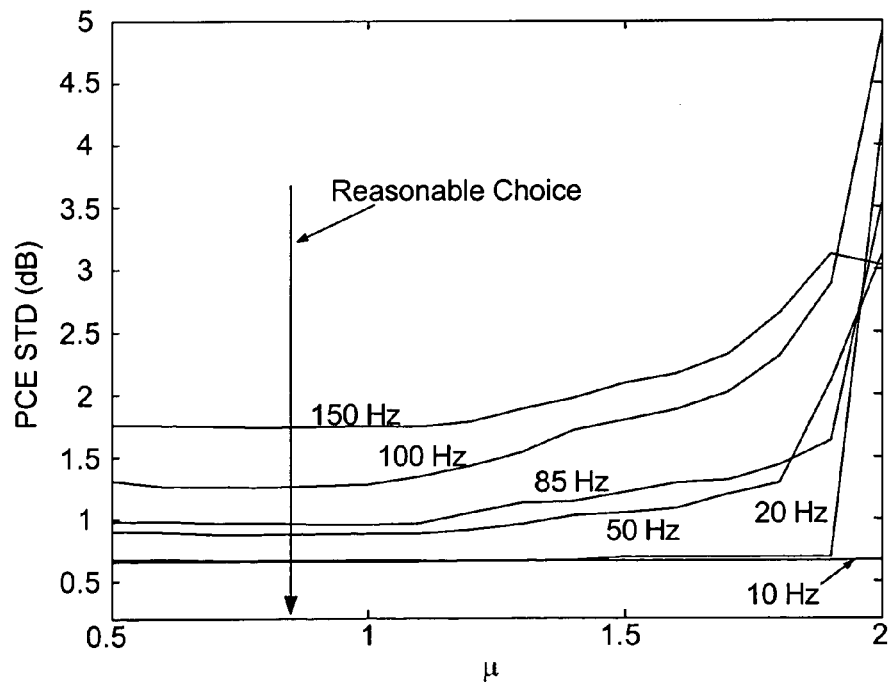
FIG. 20 is a graph showing the effect of choosing $\mu$ on PCE for the PR-CLPC using $\alpha=1.3$.
Figure 21:
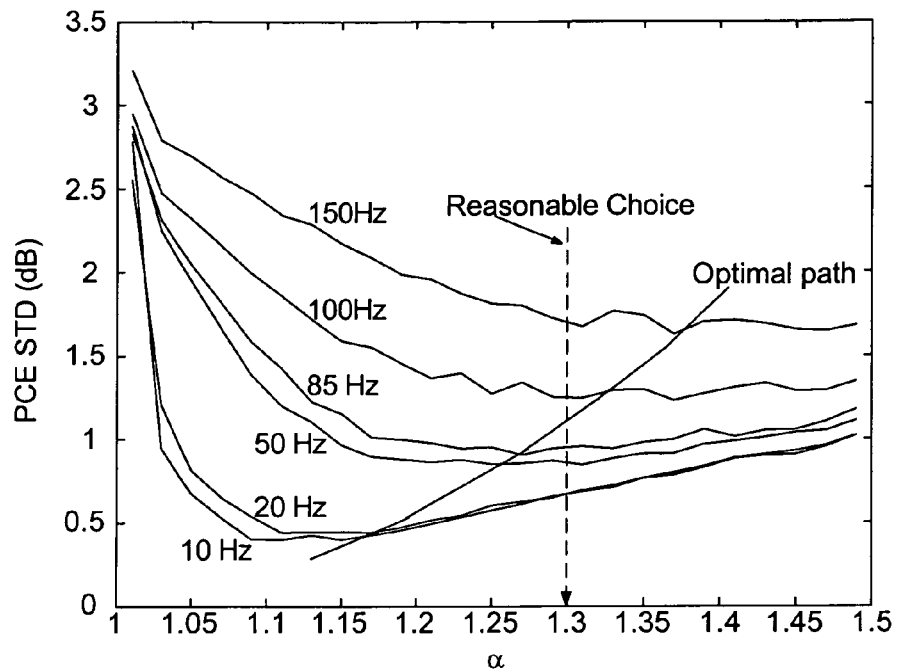
FIG. 21 is a graph showing the effect of choosing $\alpha$ on PCE for the PR-CLPC.

We start out tests by investigating the effect of μ and α on the performance of the PR-CLPC algorithm. FIG. 20 shows the effect of choosing different μ on the PCE standard deviation for different values of $f_D$. Choosing μ=0.85 results in best performance as indicated by the vertical heavy arrow in the figure. This PCE can be further reduced depending on the choice of the exponent term α as shown in FIG. 21. The optimal PCE changes in a nonlinear fashion with respect to α. When the Doppler frequency of the mobile unit can be measured, then we can refer to FIG. 21 for the optimal choice of α. However, if the Doppler frequency cannot be measured accurately, then a choice of α=1.3 seems to be reasonable as indicated by the vertical arrow in the figure.

Figure 22:
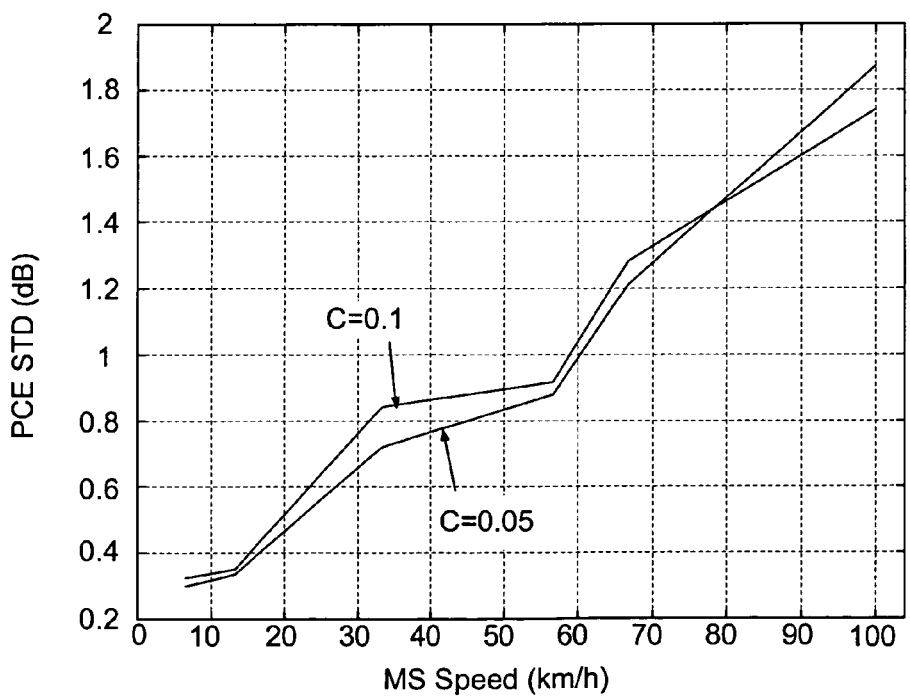
FIG. 22 is a graph showing the power errors for the APR-CLPC algorithm for two values of the adaptation constant C.

The APR-CLPC algorithm is tested via simulations. FIG. 22 shows the STD of the PCE for two different values of the adaptation constant C. The saturation limits for α are chosen as $\alpha_{min}$=1.1 and $\alpha_{max}$=2. Increasing C will improve the performance of the CLPC algorithm at high vehicle speeds but will degrade it at low speeds. Choosing C=0.1 was found reasonable for all tested applications.

Figure 23:
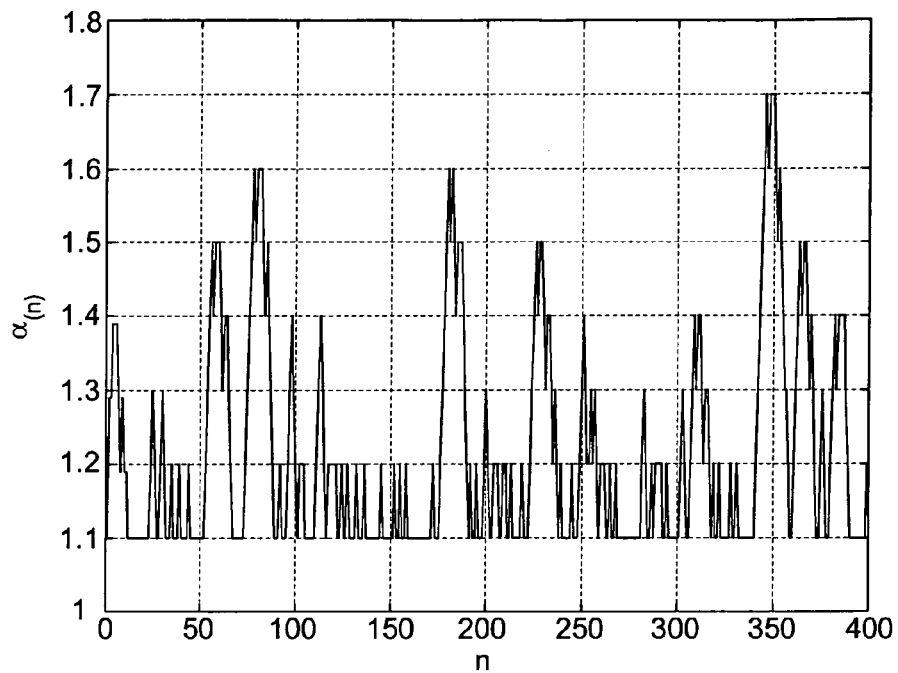
FIG. 23 is a graph showing a typical response for the exponent term $\alpha_c(n)$ of the adaptive DI-CLPC algorithm over time for a Rayleigh fading channel with $f_D=85$ Hz.

FIG. 23 shows a typical response of the adaptive coding term $\alpha_c(n)$, used in the ADI-CLPC algorithm as a function of time with $f_D$=85 Hz. The mean and variance values for $\alpha_c(n)$ in this example are 1.22 and 0.02, respectively.

Figure 24:
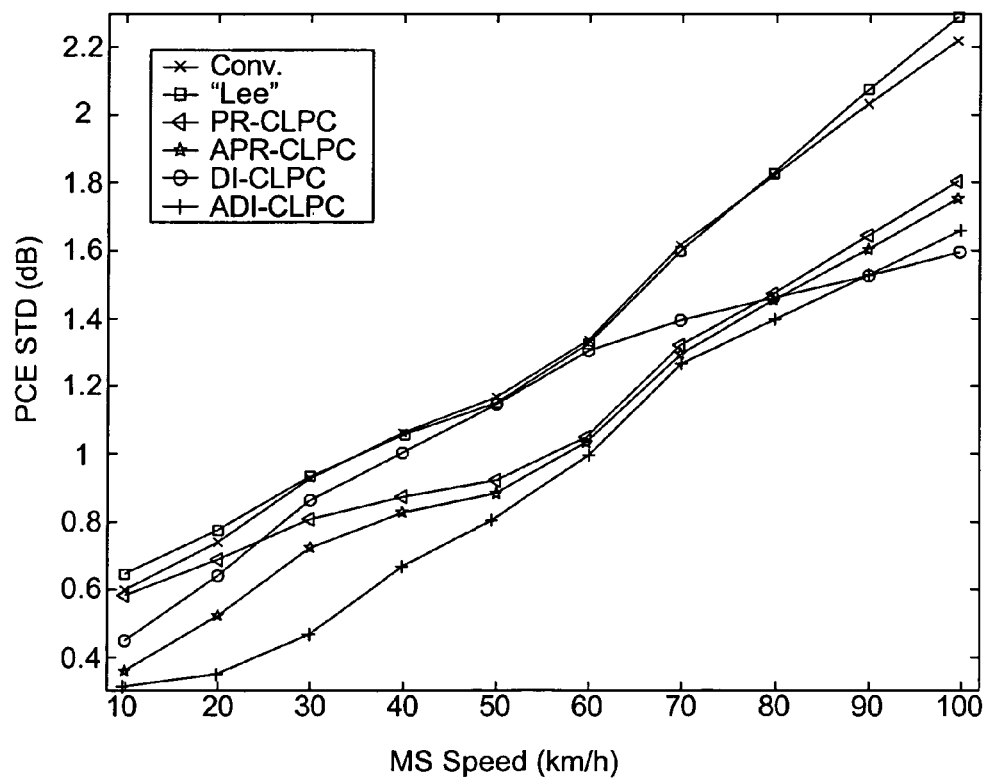
FIG. 24 is a graph showing the performance of the developed algorithms compared to conventional CLPC and a current adaptive CLPC scheme.

Finally, FIG. 24 shows PCE performance of the PR-CLPC, APR-CLPC, DI-CLPC, and ADI-CLPC. The coding parameters d(0) and $\alpha_c$ used in the DI-CLPC algorithm are chosen as 1E-3 and 1.8, respectively. Moreover, the parameters C, $\alpha_{min}$, $\alpha_{max}$ for the ADI-CLPC algorithm are set to 0.1, 1.1, and 2, respectively. FIG. 24 includes also the performance of the conventional CLPC and that of an adaptive CLPC developed in [14], for the sake of comparison. The ADI-CLPC demonstrates the best performance over all other algorithms.

The IE-CLPC and OP-CLPC algorithms are also implemented using simulations. In simulating these algorithms, we assume that a coder is available which results in certain SNR, where the SNR of the coder is defined as $$SNR = \frac{\sigma_x^2}{\sigma_{e_c}^2}$$

where x is the input to the encoder and $e_c$ is the coding error (the difference between the output of the decoder and x). In this experiment, we choose a value for the SNR and then measure the corresponding PCE. We repeat this experiment for different SNR values.

Figure 25:
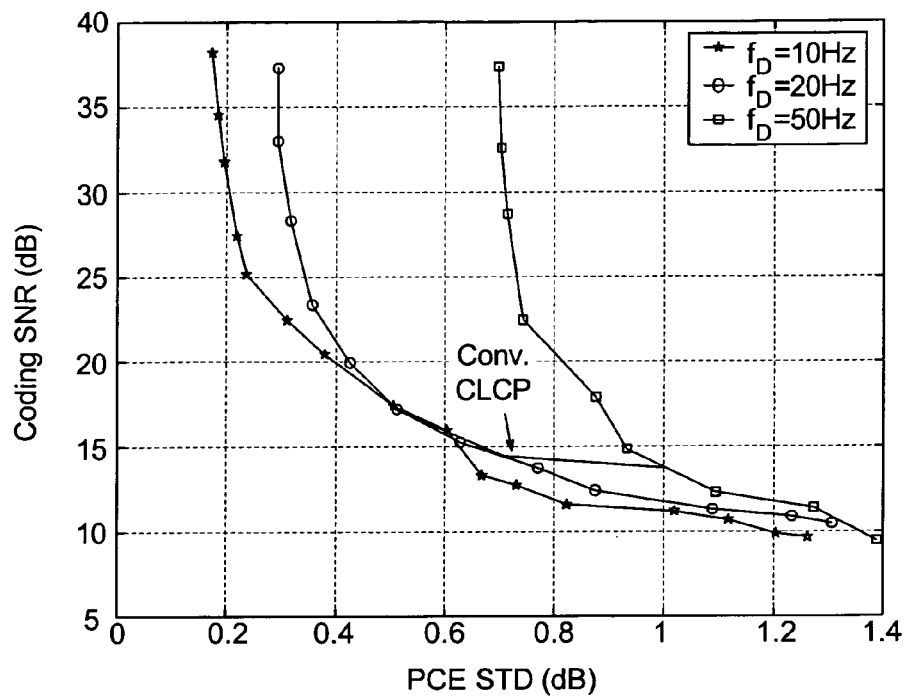
FIG. 25 is a graph showing the coding SNR versus power control error standard deviation for IE-CLPC with $f_D=[10, 20, 50]$ Hz.
Figure 26:
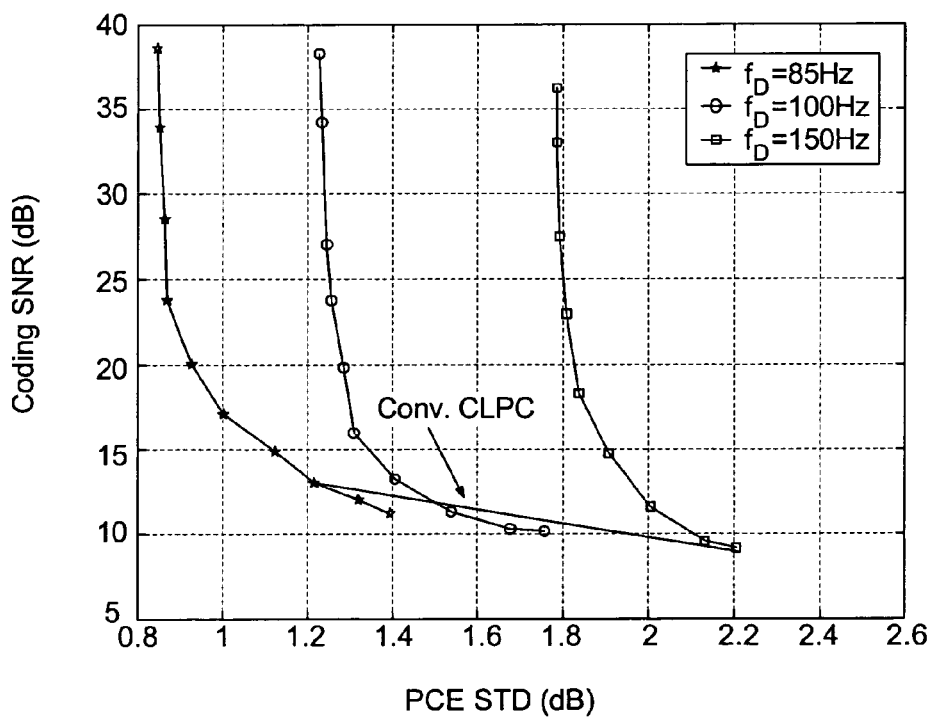
FIG. 26 is a graph showing the coding SNR versus power control error standard deviation for IE-CLPC with $f_D=[85, 100, 150]$ Hz.

In the IE-CLPC, a single-tap NLMS linear filter is used to perform the equalization with step-size $\mu$=0.9. FIGS. 25 and 26 show the coding SNR versus PCE for $f_D$=[10, 20, 50, 85, 100, 150]Hz. The figures include also the PCE error for conventional CLPC (heavy line) at these Doppler frequencies for th sake of comparison. To make improvement over conventional CLPC, it is necessary to have a coding SNR that is aboe this line. For example, at $f_D$=20 Hz, coding SNR should be more than 14 dB for this algorithm to show improvement over conventional CLPC.

Figure 27:
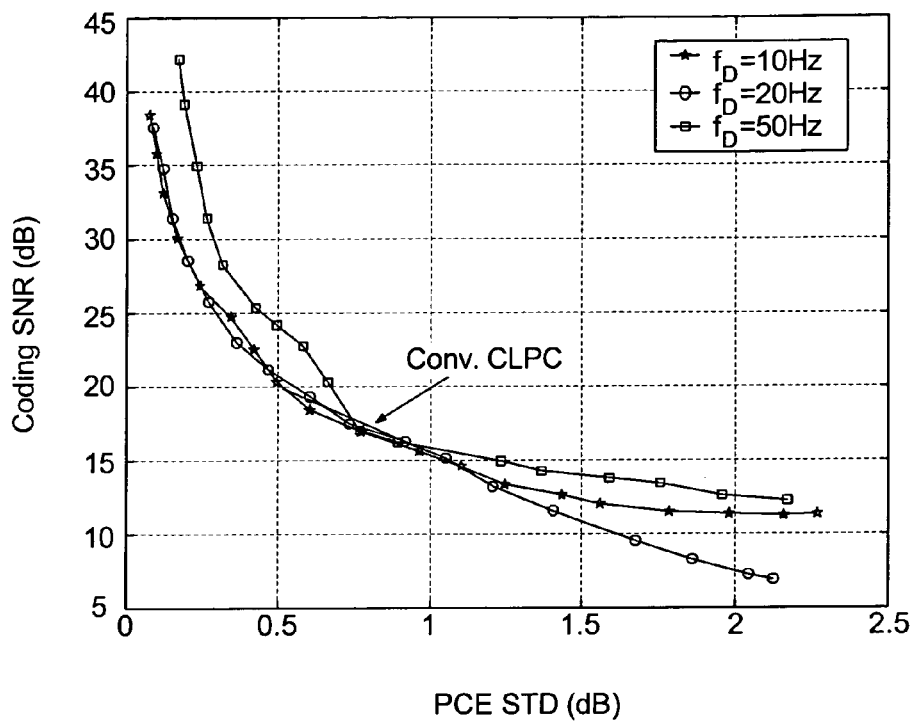
FIG. 27 is a graph showing the coding SNR versus power control error standard deviation for OP-CLPC with $f_D$=[10, 20,50] Hz.
Figure 28:
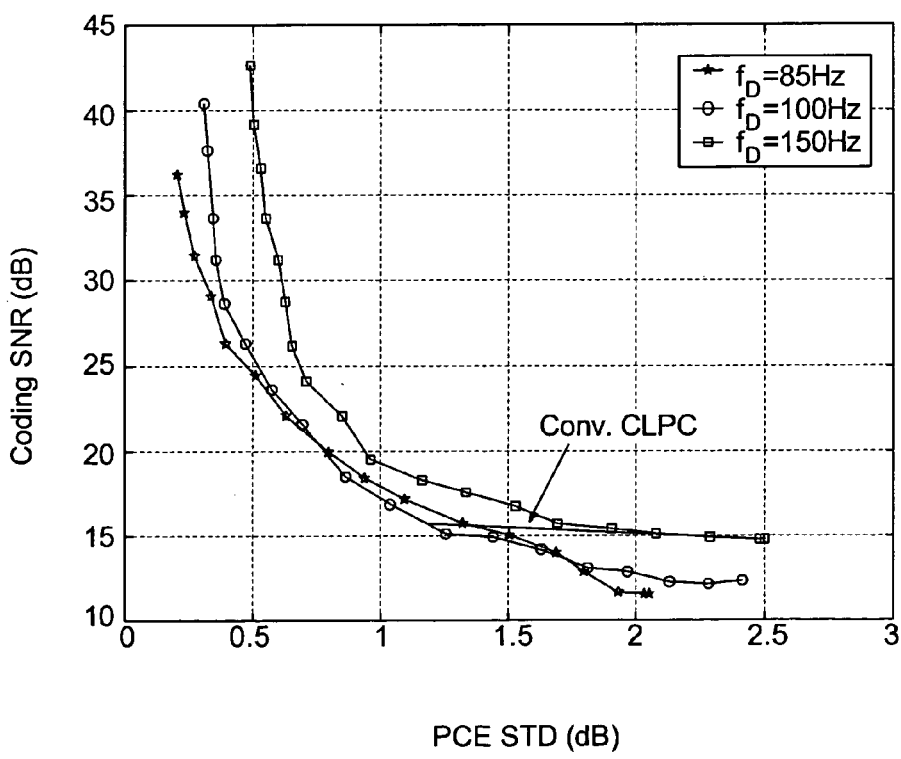
FIG. 28 is a graph showing the coding SNR versus power control error standard deviation for OP-CLPC with $f_D$=[85, 100,150] Hz.

The same test is applied to the OP-CLPC algorithm. FIGS. 27 and 28 show the SNR versus PCE plots for all $f_D$ under study for the OP-CLPC algorithm.

We apply this test again to the EC-CLPC algorithm. The coding SNR in this case becomes $$SNR = \frac{\sigma_{e_a}^2}{\sigma_{e_a-e_a}^2}$$

Figure 29:
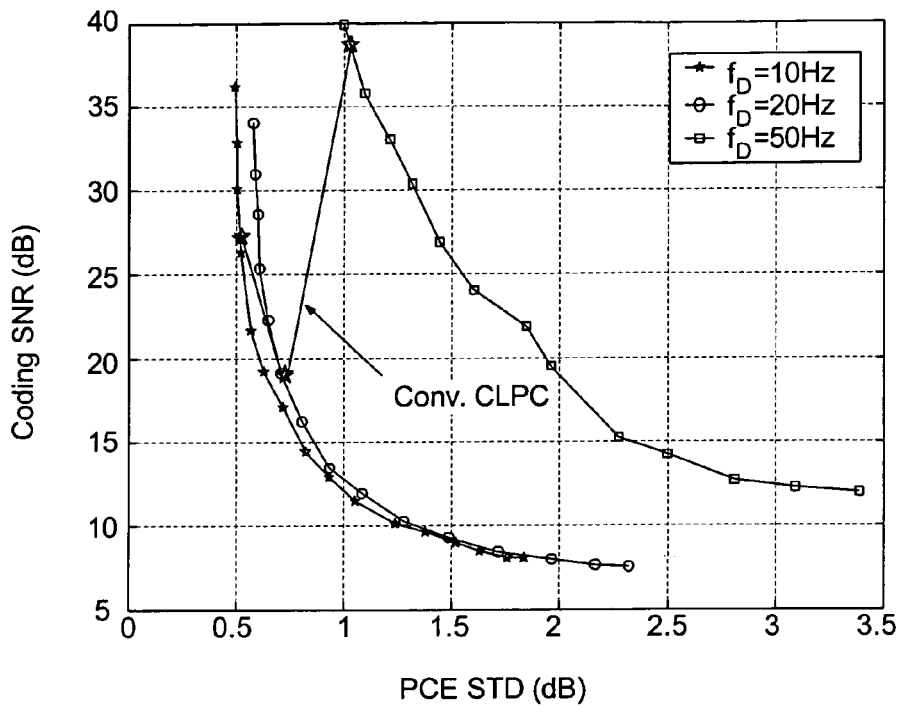
FIG. 29 is a graph showing the coding SNR versus power control error standard deviation for EC-CLPC with $f_D$=[10, 20,50] Hz.
Figure 30:
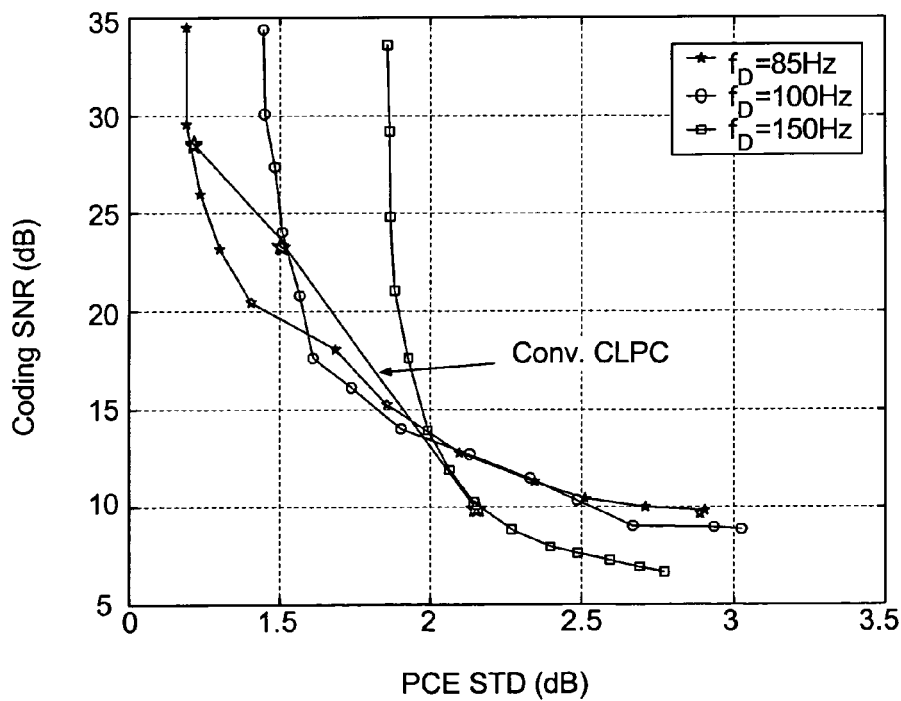
FIG. 30 is a graph showing the coding SNR versus power control error standard deviation for EC-CLPC with $f_D$=[85, 100,150] Hz.

FIG. 29 shows the coding SNR required for a certain PCE for $f_D$=[10, 20, 50]Hz. The same relation for $f_D$=[85, 100, 150]Hz is shown in FIG. 30. From these two figures, we can see that this algorithm requires a high coding SNR at moderate Doppler frequencies (more than 40 dB). This behavior is common to all simulations made. Therefore, this algorithm performs moderately well at low and high Doppler frequencies while it shows bad performance at moderate frequencies. Furthermore, we can determine from these figures the minimum achievable PCE. No matter how high the coding SNR is, no further improvement in the PCE is expected behind this minimal value. For example, the minimum achievable PCE by the EC-CLPC algorithm for $f_D$=100 Hz is 1.45 dB.

Table IX shows the minimum coding SNR required for the EC-CLPC, IE-CLPC, and OP-CLPC algorithms so that they show improvement over conventional CLPC.

TABLE IX

Minimum coding SNR for the EC-CLPC, IE-CLPC and OP-CLPC

| $f_D$ (Hz) | Vehicle Speed (km/h) | $SNR_{min}$ (dB) | | |
|---|---|---|---|---|
| | | EC-CLPC | IE-CLPC | OP-CLPC |
| 10 | 6.7 | 27 | 17 | 20 |
| 20 | 13.3 | 19 | 14 | 17 |
| 50 | 33.3 | 38 | 14 | 15 |
| 85 | 56.7 | 28 | 13 | 16 |
| 100 | 66.7 | 23 | 12 | 16 |
| 150 | 100 | 10 | 9 | 16 |

The IE-CLPC algorithm demonstrates the best performance among other algorithms in terms of the minimum SNR required to achieve the PCE corresponding to the conventional CLPC. EC-CLPC is the worst from the prospective. Moreover, we show in Table X the minimum achievable PCE for these algorithms.

TABLE X

Minimum achievable PCE for the EC-CLPC, IE-CLPC and OP-CLPC

| $f_D$ (Hz) | Vehicle Speed (km/h) | $PCE_{min}$ (dB) | | |
|---|---|---|---|---|
| | | EC-CLPC | IE-CLPC | OP-CLPC |
| 10 | 6.7 | 0.5 | 0.18 | 0.05 |
| 20 | 13.3 | 0.6 | 0.3 | 0.06 |
| 50 | 33.3 | 0.9 | 0.7 | 0.2 |
| 85 | 56.7 | 1.2 | 0.82 | 0.23 |
| 100 | 66.7 | 1.4 | 1.22 | 0.25 |
| 150 | 100 | 1.8 | 1.78 | 0.5 |

The OP-CLPC algorithm has the best performance in terms of the minimum reachable PCE. The OP-CLPC performs very well compared to other two algorithms especially at high vehicle speeds. Once again, EC-CLPC algorithm shows worst performance in terms of the minimum achievable PCE.

IX. Contributions of this Work

In this work, the conventional CLPC scheme used in IS-95 CDMA wireless systems is analyzed. It is found that the conventional CLPC implements a similar structure to that of the adaptation scheme used in a previously developed ADM (adaptive delta modulation). Our analysis shows that the power control error is a function of two factors (see (25)):

1. The variation in the channel power fading.
2. The quantization noise of the sign function.

The work also includes a method for predicting the channel power fading. This method uses an adaptive algorithm to perform prediction. It also improves the prediction by oversampling the received power signal.

We then described three classes of methods to decrease the power control error in closed loop power control. We described several algorithms to implement these methods.

The first algorithm described in this work, namely, PR-CLPC, minimizes part of power control error expression (36) by introducing a ratio block at the BS receiver. It was shown that the new error expression is a function of a prediction error of the channel power fading and not on the difference in fading samples as in conventional CLPC. Thus, any prediction with acceptable accuracy will improve the power control error. The prediction method proposed in Section III is used here. When compared with conventional CLPC, the algorithm shows less power errors for all vehicle speeds tested.

The second algorithm is named APR-CLPC. This algorithm is similar to PR-CLPC except that the exponent term $\alpha$ is adapted to cope with large variations in the channel fading. Simulations of this algorithm show an improved error performance over PR-CLPC.

In the DI-CLPC algorithm, the BS approximates the transmission power that should be used by MS. It then conveys this information to the MS through suitable source coding. This algorithm shows an improved performance over conventional CLPC, especially at higher vehicle speeds.

The DI-ClPC algorithm is extended to the adaptive case, where the exponent term $\alpha_c$ inside the coder is now adapted. The new algorithm is denoted ADI-CLPC. This algorithm shows the best performance among all proposed algorithms.

We also described two additional algorithms, namely, IE-CLPC and OP-CLPC. In the IE-CLPC, the BS estimates the inverse of the channel through equalization. It then transmits this information to the MS, which in turn uses it as its transmission power. In the OP-CLPC, the power control problem is posed as a least-mean-squares optimization problem.

The last algorithm described in this work is named EC-CLPC. In this algorithm, the BS transmits more information about the power error to the MS than just its sign. The MS then uses this extra information to improve the performance of the loop.

The IE-CLPC, OP-CLPC, and EC-CLPC algorithms depend heavily on the performance of the coding scheme used to convey information. Therefore, the simulations of these four algorithms are made in terms of the performance of the coding scheme used. It was shown through simulations that these four algorithms can improve the performance of the CLPC provided that a low-error coding scheme is used.

X. References

The following references are incorporated by reference herein:

[1] T. Ojanpera and R. Prasad, Wideband CDMA for Third Generation Mobile Communications, Artech House, London, 1998.

[2] W. Xinyu, G. Ling, and L. Guoping, "Adaptive power control on the reverse link for CDMA cellular system," Proc. of APCC/OECC'99—5th Asia Pacific Conference on Communications/4th Optoelectronics and Communications Conference, Beijing China, October 1999, vol. 1, pp. 608-11.

[3] S. Nourizadeh, P. Taaghol and R. Tafazolli, "A Novel Closed Loop Power Control for UMTS," First International Conference on 3G Mobile Communication Technologies, London, UK, March 2000, pp. 56-9.

[4] S. Park and H. Nam, "DS/CDMA closed-loop power control with adaptive algorithm," Electronics Letters, IEE, Aug. 19, 1999, Vol. 35, No. 17, pp. 1425-7.

[5] M. Sim, E. Gunawan, B. Soong and C. Soh, "Performance study of close-loop power control algorithms for a cellular CDMA system," IEEE Transactions on Vehicular Technology, IEEE, May 1999, Vol. 48, No. 3, pp. 911-21.

[6] H. Su and E. Geraniotis, "Adaptive closed-loop power control with quantized feedback and loop filtering," Ninth IEEE International Symposium on Personal, Indoor and Mobile Radio Communications, Boston, Mass., USA, September 1998, IEEE, Vol. 2, pp. 926-31.

[7] S. Choe, T. Chulajat, H. Kwon, K. Byung-Jin and S. Hong, "Linear prediction at base station for closed loop power control," IEEE 49th Vehicular Technology Conference, Houston, Tex., USA, May 1999, Vol. 2, pp. 1469-73.

[8] J. Tanskanen, A. Huang and I. Hartime, "Predictive power estimators in CDMA closed loop power control," 48th IEEE Vehicular Technology Conference, Ottawa, Ont., Canada, May 18-21, 1998, IEEE, Vol. 2, pp. 1091-5.

[9] A. Abrardo and D. Sennati, "On the analytical evaluation of closed-loop power-control error statistics in DS-CDMA cellular systems," IEEE Trans. Vehic. Tech., Vol. 49, No. 6, pp. 2071-80, November 2000.

[10] F. Lau and W. Tam, "Intelligent closed-loop power control algorithm in CDMA mobile radio system," Electronics Letters, Vol. 35, No. 10, pp. 785-6, May 1999.

[11] M. Aldajani and A. H. Sayed, "An adaptive structure for sigma delta modulation with improved dynamic range," Proc. 43rd Midwest Symposium on Circuits and Systems, Lansing, Mich., August 2000.

[12] M. Aldajani and A. H. Sayed, "A stable adaptive structure for delta modulation with improved performance," Proc. ICASSP, vol. IV, Salt Lake City, Utah, May 2001.

[13] M. Aldajani and A. H. Sayed, "Stability and performance analysis of an adaptive sigma delta modulator," IEEE Trans. Circuits and Sytems II, vol. 48, no. 3, pp. 233-244, March 2001.

[14] C. Lee and C. Steele, "Closed-loop power control in CDMA systems" Iee Proceedings-Communications, vol. 143, no. 4, pp. 231-9, August 1996.

[15] V. Garg and J. Wilkes, Principles and Applications of GSM, Prentice Hall, N.J., 1999.

XI. Conclusion

This concludes the description of the preferred embodiment of the invention. The following describes some alternative embodiments for accomplishing the present invention.

For example, any type of wireless communications system could be used with the present invention. Moreover, any type of base or mobile station could benefit from the present invention. Further, various commands or codings could be used in place of those found in the preferred embodiments, without departing from the scope of the present invention. Finally, different sequences of steps, commands or functions or adaptive filters could be used in place of those found in the preferred embodiments, without departing from the scope of the present invention.

In summary, the present invention analyzes a conventional closed loop control (CLPC) and derives an expression for the power control error in terms of the channel fading. The expression suggests methods for reducing the error variance. This is achieved by using a prediction technique for estimating the channel power fading via oversampling of the received and transmitted powers. The prediction module is then combined with several proposed schemes for closed loop power control. The resulting architectures are shown to result in improved performance in extensive simulations.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of power control in a wireless communications system, comprising:
  (a) measuring a received power from a mobile station at a base station;
  (b) estimating a channel power fading from a previous transmission power;
  (c) generating a predicted channel power fading;
  (d) multiplying the received power by a ratio of the predicted channel power fading divided by the estimated channel power fading to generate a result;

(e) comparing the result with a desired power level to determine a power command for the mobile station; and (f) transmitting the power command to the mobile station, wherein the mobile station increments or decrements its transmission power by a step change in response to the power command.

2. An apparatus for power control in a wireless communications system, comprising:
   (a) means for measuring a received power from a mobile station at a base station;
   (b) means for estimating a channel power fading from a previous transmission power;
   (c) means for generating a predicted channel power fading;
   (d) means for multiplying the received power by a ratio of the predicted channel power fading divided by the estimated channel power fading to generate a result;
   (e) means for comparing the result with a desired power level to determine a power command for the mobile station; and
   (f) means for transmitting the power command to the mobile station, wherein the mobile station increments or decrements its transmission power by a step change in response to the power command.

3. A method of power control in a wireless communications system, comprising:
   (a) measuring a received power from a mobile station at a base station;
   (b) estimating a channel power fading from a previous transmission power;
   (c) generating a predicted channel power fading;
   (d) multiplying the received power by a ratio of the predicted channel power fading divided by the estimated channel power fading to generate a result;
   (e) comparing the result with a desired power level to determine a power command for the mobile station; and
   (f) transmitting the power command to the mobile station, wherein the mobile station computes a signal from the power command and previously-received power commands, computes a term from the signal, computes a step change from the term and increments or decrements its transmission power by the step change.

4. The method of claim 3, further comprising: computing the term $\alpha(n)$ from:

$$\alpha(n)=\alpha(n-1)+\lambda(n)C$$

where C is a positive constant and $\lambda(n)$ is the signal according to:

$$\lambda(n) = \begin{cases} +1 & \text{if} \quad b(n) = b(n-1) = b(n-2) \\ -1 & \text{if} \quad b(n) \neq b(n-1) \\ 0 & \text{otherwise} \end{cases}$$

b(n) is the power command, and b(n−1) and b(n−2) are the previously-received power commands, and the term $\alpha(n)$ is limited by lower and upper bounds:

$$\alpha(n) = \begin{cases} \alpha_{max} & \text{if } \alpha(n) > \alpha_{max} \\ \alpha_{max} & \text{if } \alpha(n) < \alpha_{min.} \end{cases}$$

5. The method of claim 3, further comprising: computing the step change $\psi(n)$ according to:

$$\psi(n)=10 \log_{10}\alpha(n).$$

6. An apparatus for power control in a wireless communications system, comprising:
   (a) means for measuring a received power from a mobile station at a base station;
   (b) means for estimating a channel power fading from a previous transmission power;
   (c) means for generating a predicted channel power fading;
   (d) means for multiplying the received power by a ratio of the predicted channel power fading divided by the estimated channel power fading to generate a result;
   (e) means for comparing the result with a desired power level to determine a power command for the mobile station; and
   (f) means for transmitting the power command to the mobile station, wherein the mobile station computes a signal from the power command and previously-received power commands, computes a term from the signal, computes a step change from the term and increments or decrements its transmission power by the step change.

7. The apparatus of claim 6, further comprising means for: computing the term $\alpha(n)$ from:

$$\alpha(n)=\alpha(n-1)+\lambda(n)C$$

where C is a positive constant and $\lambda(n)$ is the signal according to:

$$\lambda = \begin{cases} +1 & \text{if} \quad b(n) = b(n-1) = b(n-2) \\ -1 & \text{if} \quad b(n) \neq b(n-1) \\ 0 & \text{otherwise} \end{cases}$$

b(n) is the power command, and b(n−1) and b(n−2) are the previously-received power commands, and the term $\alpha(n)$ is limited by lower and upper bounds:

$$\alpha = (n) \begin{cases} \alpha_{max} & \text{if } \alpha(n) > \alpha_{max} \\ \alpha_{max} & \text{if } \alpha(n) < \alpha_{min.} \end{cases}$$

8. The apparatus of claim 6, further comprising means for: computing the step change $\psi(n)$ according to:

$$\psi(n)=10 \log_{10}\alpha(n).$$

9. A method of power control in a wireless communications system, comprising:
   (a) measuring a received power from a mobile station at a base station;
   (b) estimating a channel power fading from a previous transmission power;
   (c) generating a predicted channel power fading;
   (d) generating an estimated transmission power from a ratio of the desired power level divided by the predicted channel power fading;
   (e) encoding the estimated transmission power to generate encoded data; and
   (f) transmitting the encoded data to the mobile station, wherein the mobile station decodes the encoded data to obtain the estimated transmission power and sets its transmission power to the estimated transmission power.

10. An apparatus for power control in a wireless communications system, comprising:
    (a) means for measuring a received power from a mobile station at a base station;

(b) means for estimating a channel power fading from a previous transmission power;

(c) means for generating a predicted channel power fading;

(d) means for generating an estimated transmission power from a ratio of the desired power level divided by the predicted channel power fading;

(e) means for encoding the estimated transmission power to generate encoded data; and (f) means for transmitting the encoded data to the mobile station, wherein the mobile station decodes the encoded data to obtain the estimated transmission power and sets its transmission power to the estimated transmission power.

11. A method of power control in a wireless communications system, comprising:

(a) measuring a received power from a mobile station at a base station;

(b) estimating a channel power fading from a previous transmission power;

(c) generating a predicted channel power fading;

(d) generating an estimated transmission power from a ratio of the desired power level divided by the predicted channel power fading;

(e) encoding the estimated transmission power to generate coded data; and (f) transmitting the coded data to the mobile station, wherein the mobile station decodes the coded data to obtain the estimated transmission power and sets its transmission power to the estimated transmission power.

12. An apparatus for power control in a wireless communications system, comprising:

(a) means for measuring a received power from a mobile station at a base station;

(b) means for estimating a channel power fading from a previous transmission power;

(c) means for generating a predicted channel power fading;

(d) means for generating an estimated transmission power from a ratio of the desired power level divided by the predicted channel power fading;

(e) means for encoding the estimated transmission power to generate coded data; and (f) means for transmitting the coded data to the mobile station, wherein the mobile station decodes the coded data to obtain the estimated transmission power and sets its transmission power to the estimated transmission power.

13. A method of power control in a wireless communications system, comprising:

(a) measuring a received power from a mobile station at a base station;

(b) performing a 1-tap equalization using the measured received power as an input and a previous transmission power as a reference;

(c) multiplying a tap value from the 1-tap equalization by a desired power level to generate an estimated transmission power;

(d) encoding the estimated transmission power to generate coded data; and (e) transmitting the coded data to the mobile station, wherein the mobile station decodes the coded data to obtain the estimated transmission power and sets its transmission power to the estimated transmission power.

14. An apparatus for power control in a wireless communications system, comprising:

(a) means for measuring a received power from a mobile station at a base station;

(b) means for performing a 1-tap equalization using the measured received power as an input and a previous transmission power as a reference;

(c) means for multiplying a tap value from the 1-tap equalization by a desired power level to generate an estimated transmission power;

(d) means for encoding the estimated transmission power to generate coded data; and (e) means for transmitting the coded data to the mobile station, wherein the mobile station decodes the coded data to obtain the estimated transmission power and sets its transmission power to the estimated transmission power.

15. A method of power control in a wireless communications system, comprising:

(a) measuring a received power from a mobile station at a base station;

(b) estimating a channel power fading from a previous transmission power;

(c) generating a predicted channel power fading;

(d) multiplying the received power by a ratio of the predicted channel power fading divided by the estimated channel power fading to generate a first result;

(e) comparing the first result with a desired power level to determine a difference;

(f) multiplying the difference by the estimated channel power fading to generate a second result;

(g) multiplying the second result by a step size to generate an estimated transmission power;

(h) encoding the estimated transmission power to generate coded data; and (i) transmitting the coded data to the mobile station, wherein the mobile station decodes the coded data to obtain the estimated transmission power and sets its transmission power to the estimated transmission power.

16. An apparatus for power control in a wireless communications system, comprising:

(a) means for measuring a received power from a mobile station at a base station;

(b) means for estimating a channel power fading from a previous transmission power;

(c) means for generating a predicted channel power fading;

(d) means for multiplying the received power by a ratio of the predicted channel power fading divided by the estimated channel power fading to generate a first result;

(e) means for comparing the first result with a desired power level to determine a difference;

(f) means for multiplying the difference by the estimated channel power fading to generate a second result;

(g) means for multiplying the second result by a step size to generate an estimated transmission power;

(h) means for encoding the estimated transmission power to generate coded data; and (i) means for transmitting the coded data to the mobile station, wherein the mobile station decodes the coded data to obtain the estimated transmission power and sets its transmission power to the estimated transmission power.

* * * * *